US011673180B2

(12) United States Patent
Takeda

(10) Patent No.: US 11,673,180 B2
(45) Date of Patent: Jun. 13, 2023

(54) WORKPIECE CONVEYING SYSTEM FOR A TRANSFER PRESS MACHINE

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 385 days.

(21) Appl. No.: 16/931,223

(22) Filed: Jul. 16, 2020

(65) Prior Publication Data
US 2021/0016339 A1 Jan. 21, 2021

(30) Foreign Application Priority Data

Jul. 17, 2019 (JP) .............................. JP2019-131844

(51) Int. Cl.
 *B21D 43/05* (2006.01)
 *F16H 25/22* (2006.01)
 (Continued)

(52) U.S. Cl.
 CPC ............ *B21D 43/05* (2013.01); *B21D 43/10* (2013.01); *B25J 9/123* (2013.01); *B25J 9/16* (2013.01);
 (Continued)

(58) Field of Classification Search
 CPC .......... B21D 43/05; B21D 43/10; B25J 9/123; B25J 9/16; B25J 15/00; B65G 47/90; F16H 25/2204
 See application file for complete search history.

(56) References Cited

U.S. PATENT DOCUMENTS

| 11,014,216 | B2 * | 5/2021 | Takeda | B21D 43/105 |
| 2017/0259434 | A1 * | 9/2017 | Takeda | B25J 15/0061 |
| 2019/0126340 | A1 * | 5/2019 | Takeda | B30B 15/142 |

FOREIGN PATENT DOCUMENTS

| CN | 109719223 A | 5/2019 |
| JP | H05-180299 A | 7/1993 |

(Continued)

OTHER PUBLICATIONS

Chinese Office Action issued in corresponding Chinese Patent Application No. 202010673344.4, dated Jul. 12, 2022, with English translation.

(Continued)

*Primary Examiner* — Saul Rodriguez
*Assistant Examiner* — Brendan P Tighe
(74) *Attorney, Agent, or Firm* — McDermott Will & Emery LLP

(57) ABSTRACT

A workpiece conveying system for a transfer press machine includes: a beam provided to extend in a feed direction of a workpiece; and a plurality of workpiece conveying apparatus supported by the beam. The workpiece conveying apparatus each include: a feed device including a first carrier that is movable relative to the beam in the feed direction; a raising and lowering device including a second carrier that is movable relative to the first carrier in a raising and lowering direction; a clamp device including a third carrier that is movable relative to the second carrier in a clamp direction of the workpiece; and a workpiece holding tool, which is supported at a distal end of the third carrier, and is configured to hold and release the workpiece.

12 Claims, 20 Drawing Sheets

(51) Int. Cl.
- *B21D 43/10* (2006.01)
- *B25J 9/12* (2006.01)
- *B25J 9/16* (2006.01)
- *B25J 15/00* (2006.01)
- *B65G 47/90* (2006.01)

(52) U.S. Cl.
CPC .............. *B25J 15/00* (2013.01); *B65G 47/90* (2013.01); *F16H 25/2204* (2013.01)

(56) References Cited

FOREIGN PATENT DOCUMENTS

| JP | H10-257716 A | 9/1998 |
|----|--------------|--------|
| JP | 2019-081196 A | 5/2019 |
| JP | 2019-81196 A | 5/2019 |

OTHER PUBLICATIONS

Notice of ex officio correction of Notice of Reasons for Refusal, dated Feb. 28, 2022, for Japanese Patent Application No. 2019-131844. 2 pages.

Notice of Reasons for Refusal, dated Feb. 8, 2022, for Japanese Patent Application No. 2019-131844. 8 pages.

\* cited by examiner

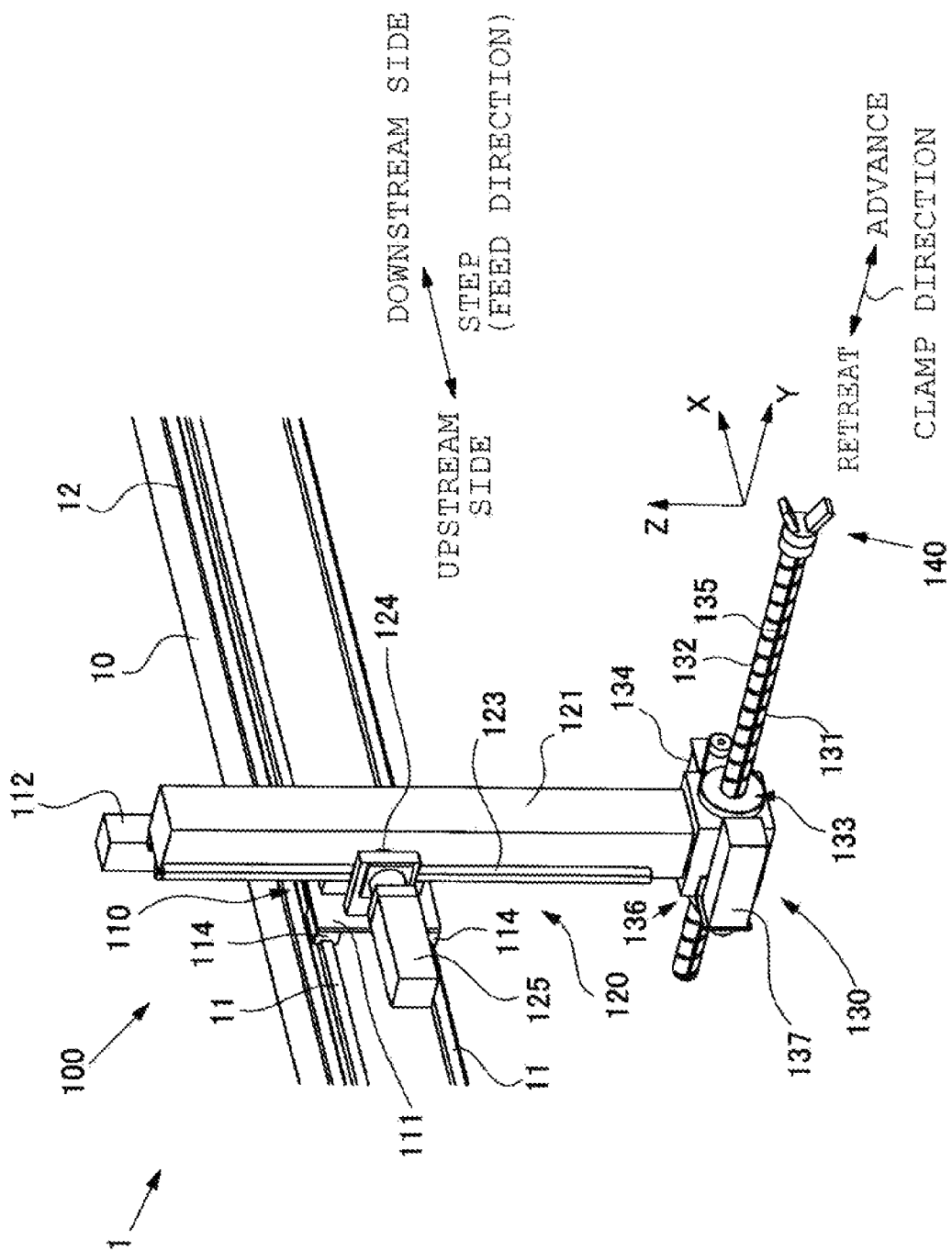

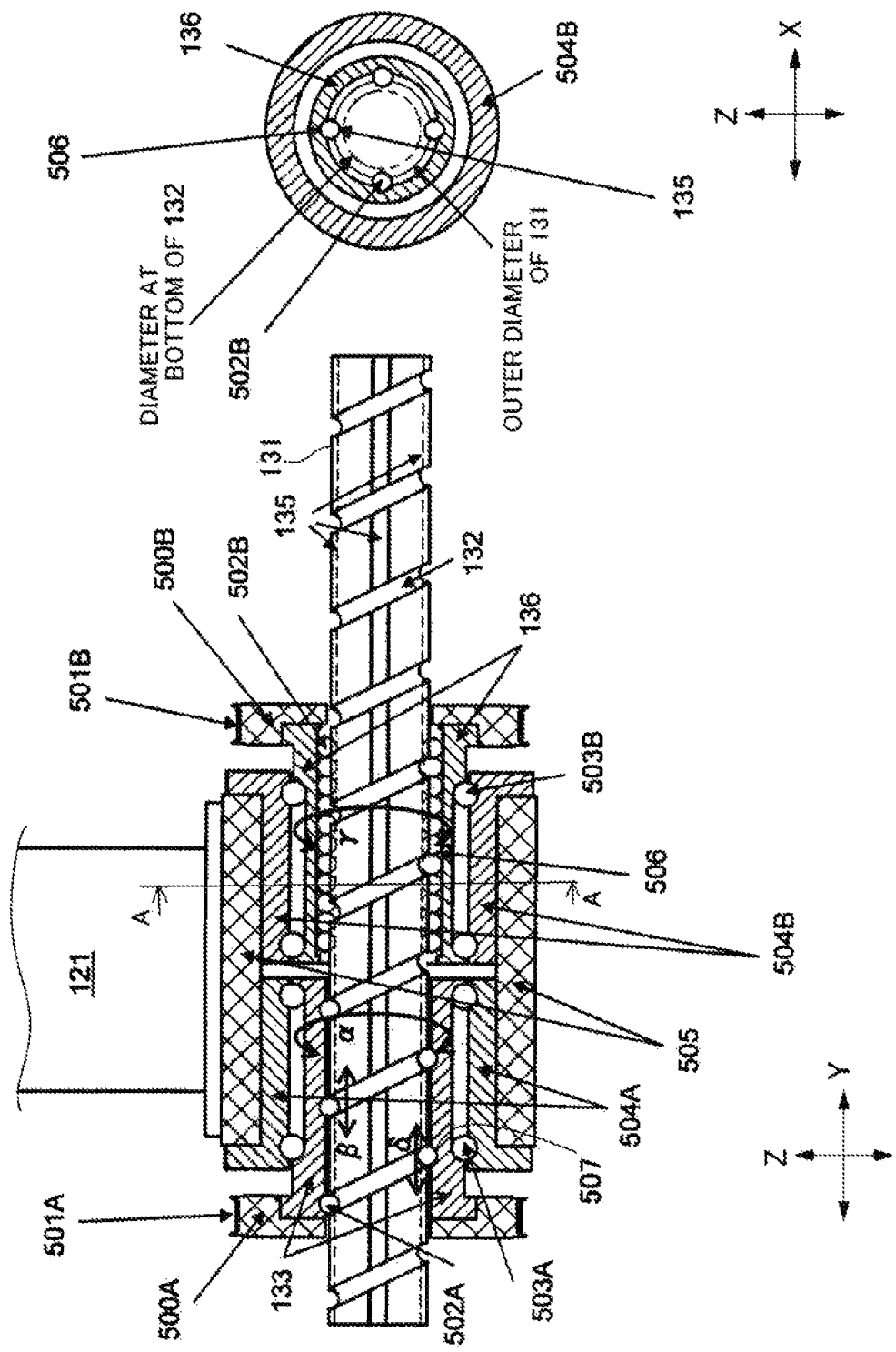

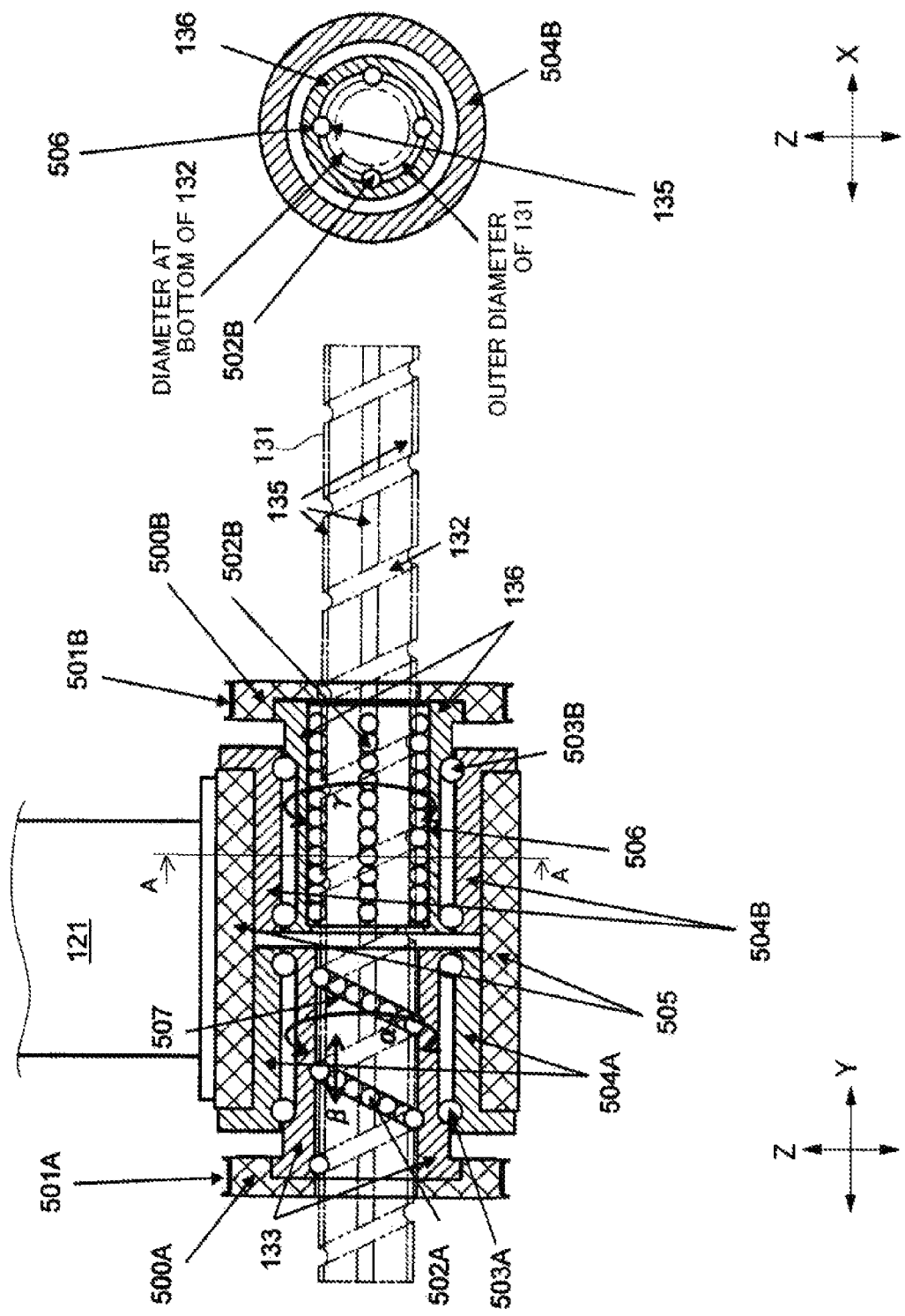

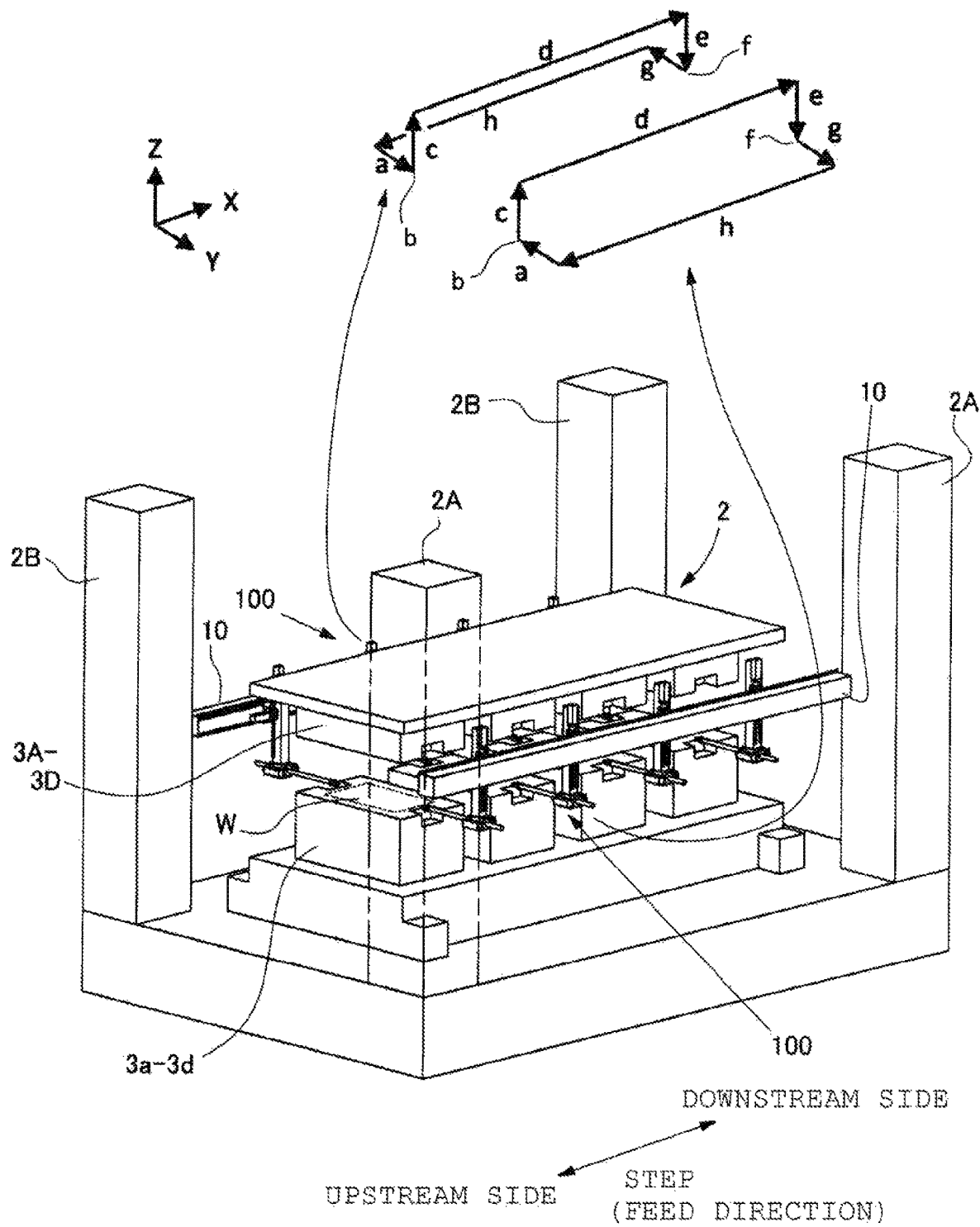

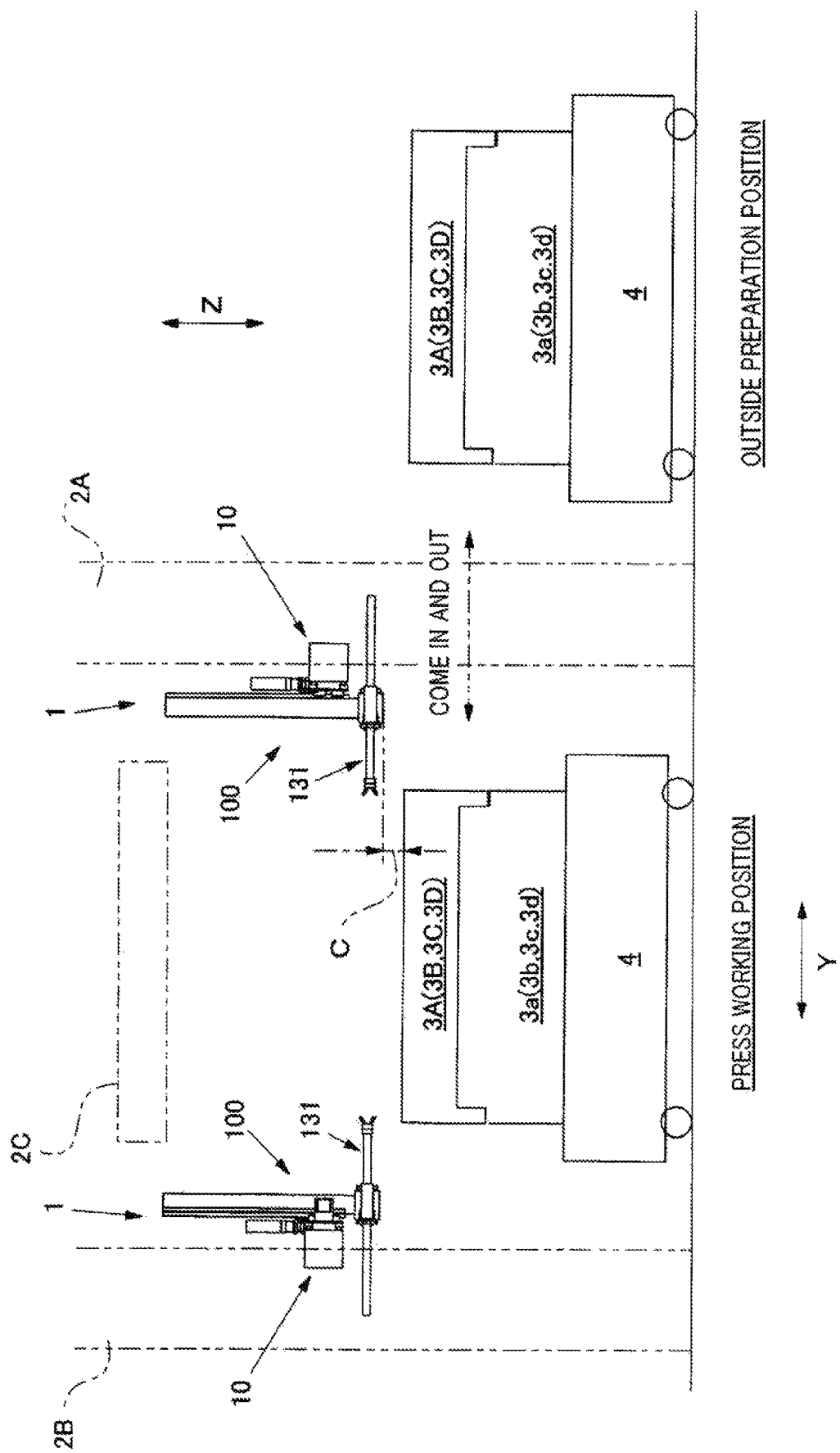

Fig. 11
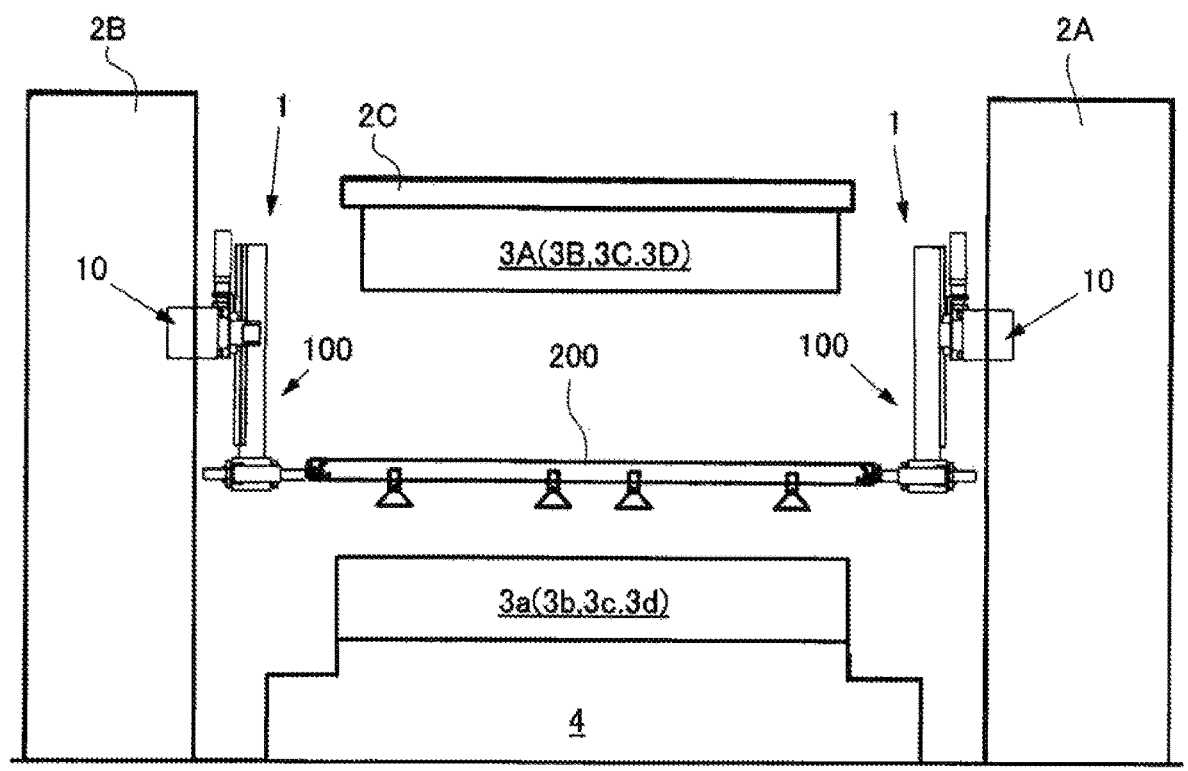
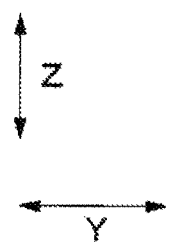

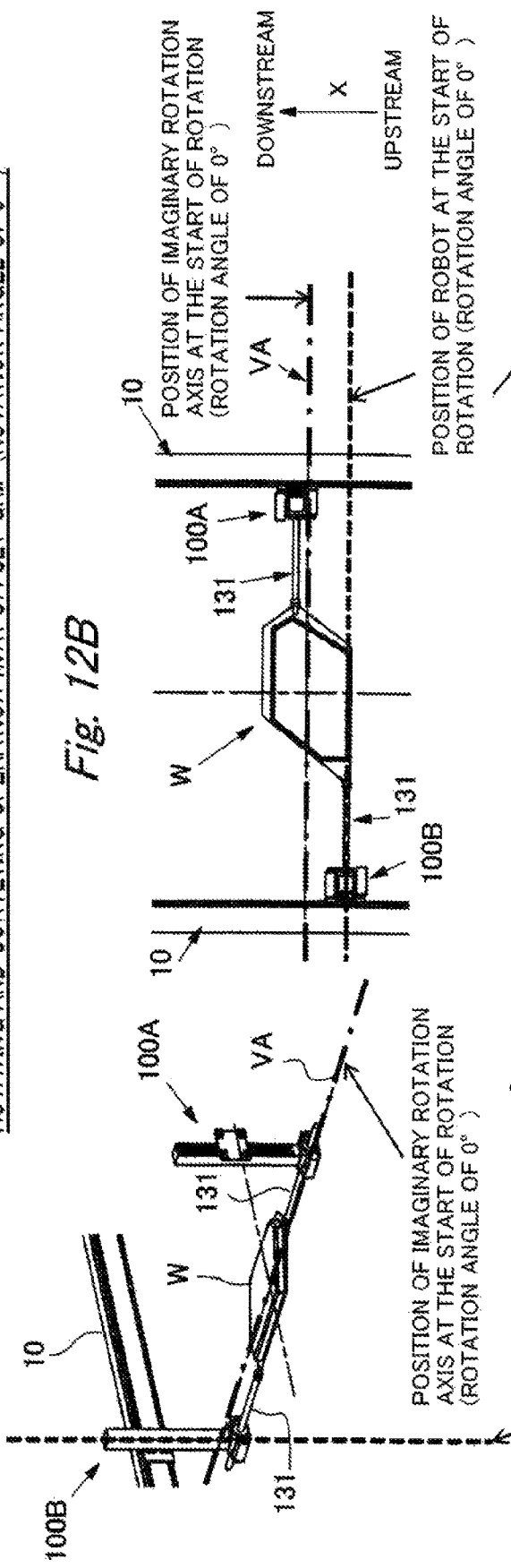

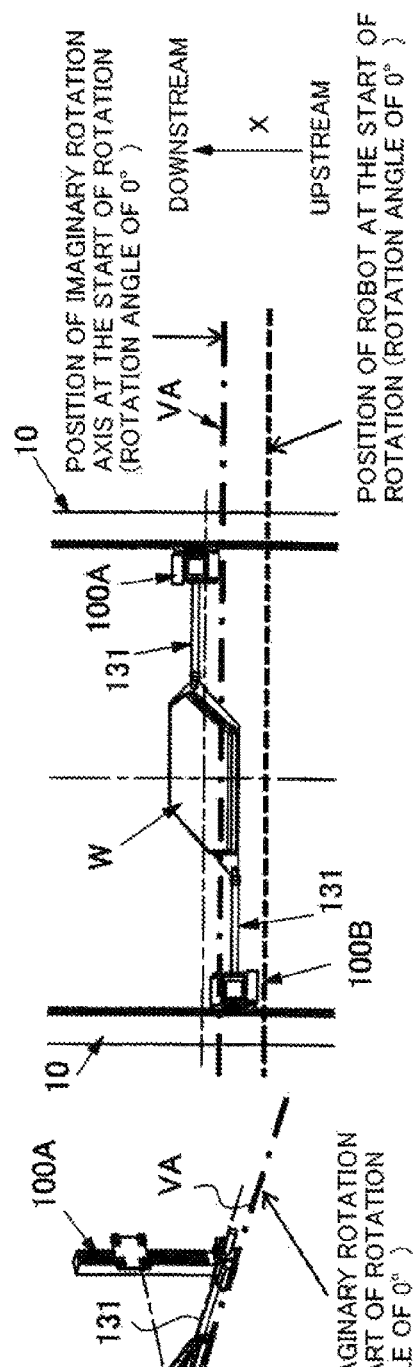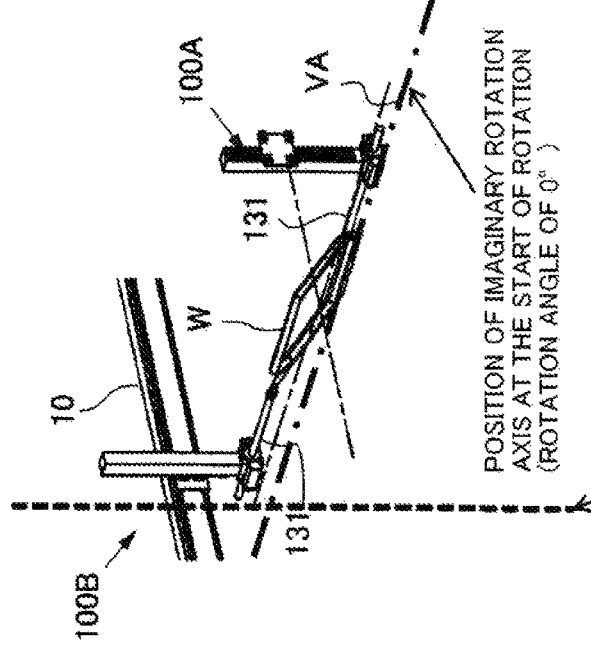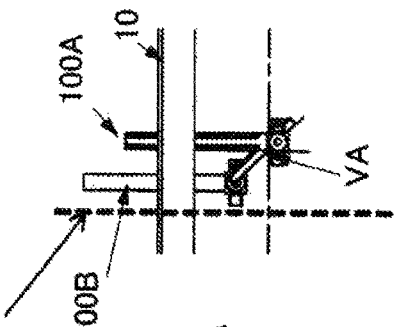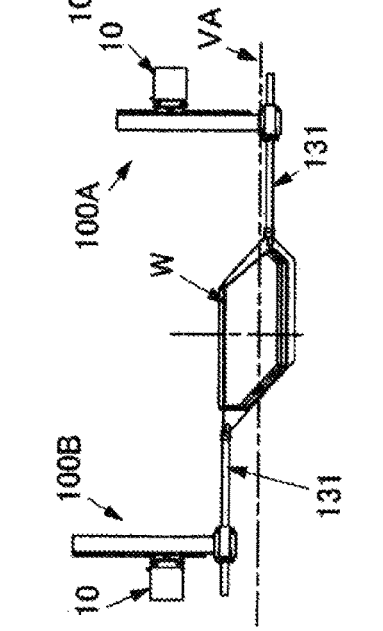

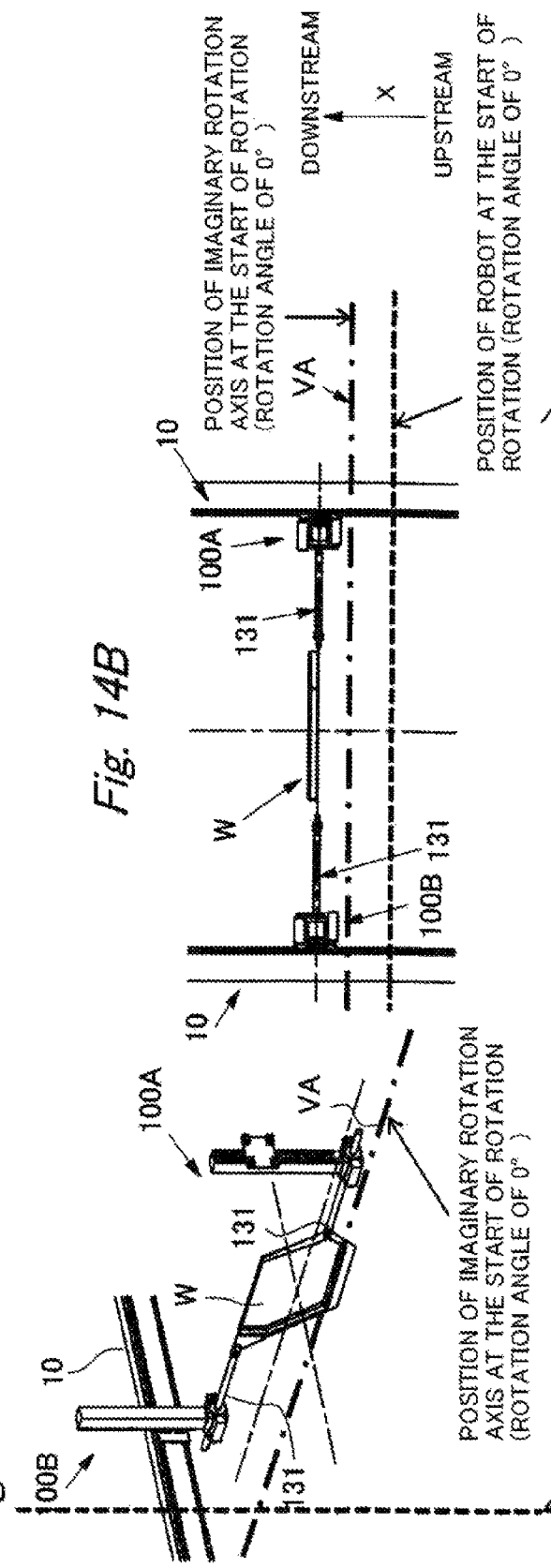

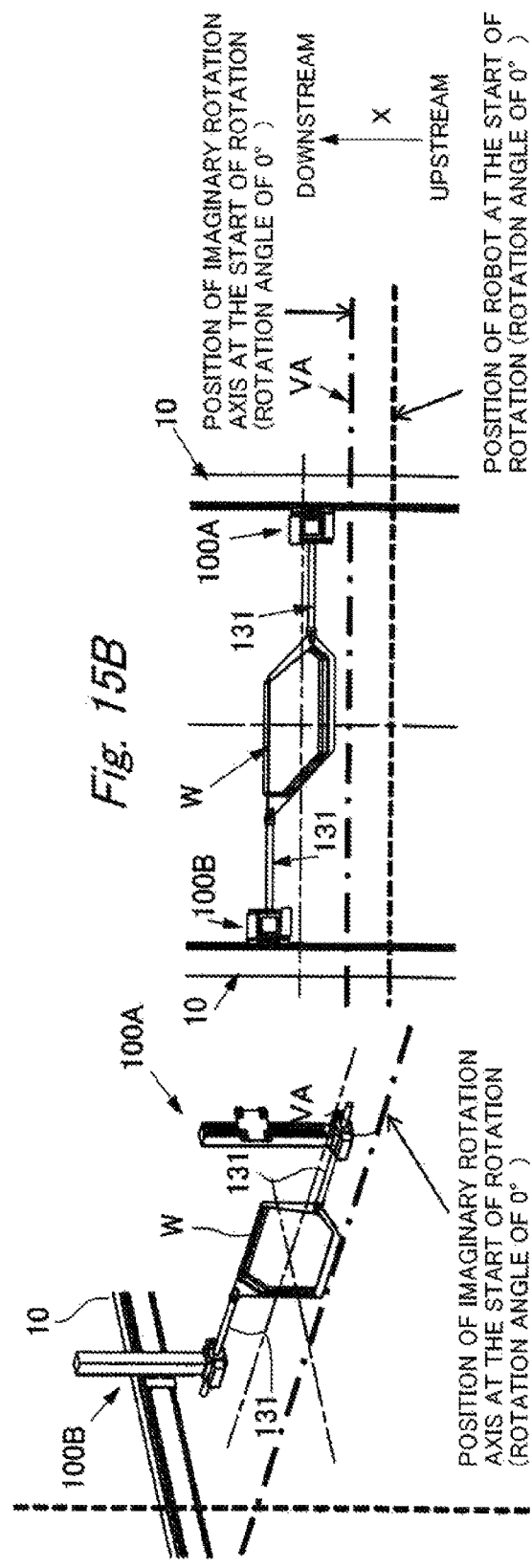

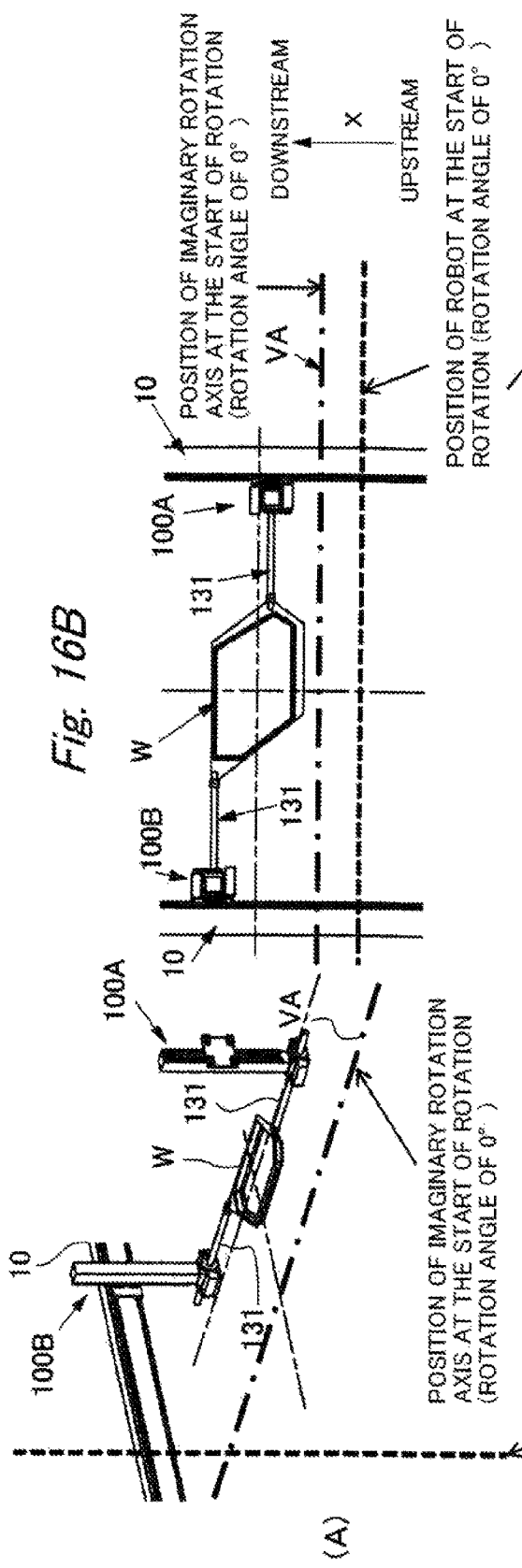
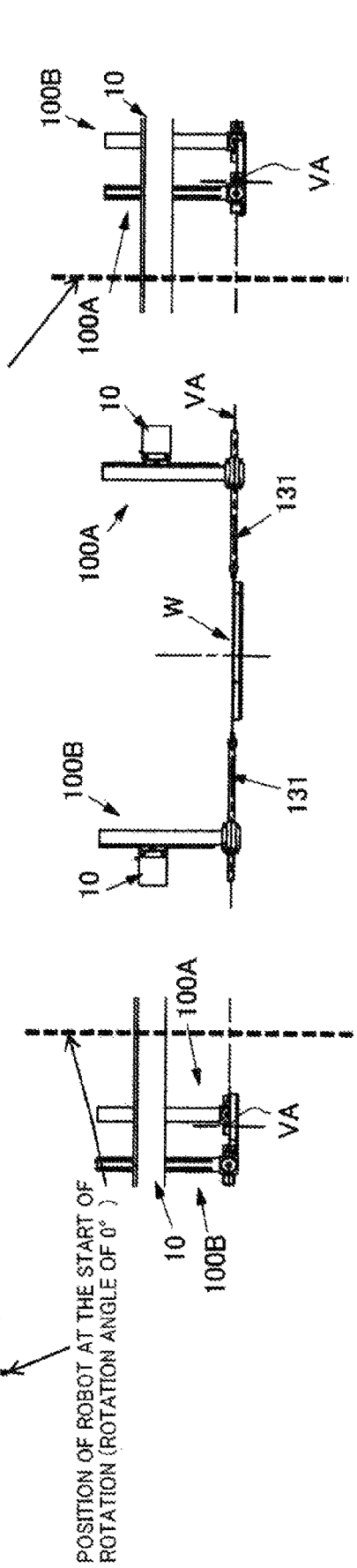

WORKPIECE CONVEYING SYSTEM FOR A TRANSFER PRESS MACHINE

CROSS-REFERENCE TO RELATED APPLICATIONS

The present application claims priority under 35 U.S.C. § 119 to Japanese Patent Application No. 2019-131844, filed on Jul. 17, 2019. The above application is hereby expressly incorporated by reference, in its entirety, into the present application.

1. FIELD OF THE INVENTION

The present invention relates to a workpiece conveying system for a transfer press machine.

2. DESCRIPTION OF THE RELATED ART

As a workpiece (material) conveying apparatus of a transfer press machine in which a plurality of multi-process (multiple) dies are arranged side by side in a workpiece conveying direction for one slide and bolster, there is known a workpiece conveying apparatus configured to sequentially convey a workpiece between the multi-process (multiple) dies from a die on upstream to a die on downstream.

For example, a related-art transfer press machine performs transfer working as follows. As illustrated in FIG. 18, two feed bars 10A and 10B extending in the workpiece conveying direction and being arranged so as to be opposed to each other approach, from both sides, a workpiece (material) that is in the middle of being formed at each stage (illustrated from 1st.stg to 6th.stg in FIG. 18) in the multi-process so that the workpiece in each process is clamped (supported or held) by fingers 20A to 25A and 203 to 253. Under this state, the transfer press machine repeats operations of lift, advance (movement to the downstream in the workpiece conveying direction), and down, and then operations of unclamp (separate the feed bars 10A and 10B away from each other to release the workpiece) and return (return to an original upstream position in the workpiece conveying direction) so as to convey the workpiece between the respective stages.

In the related-art workpiece conveying apparatus described above, the two feed bars require a plurality of fingers (workpiece holding tool) corresponding to respective stages in order to hold workpieces having different shapes, sizes, or the like corresponding to the respective stages.

Therefore, when the die is changed to change the size, the shape, or the like of the workpiece in each process, the fingers are required to be replaced in accordance with the changed size, shape, or the like of the workpiece. When such replacement is performed, it takes time to perform replacement work for respective fingers, in which the original fingers are removed from the feed bars and replaced with another fingers. As a result, stoppage time of a press line becomes longer, and in actuality, the related-art apparatus is not capable of contributing to improvement of production efficiency.

In view of improving the finger replacement work that is complicated and takes time, the applicant of the present application has provided, in Japanese Published Unexamined Patent Application No. 2019-081196, a workpiece holding tool changing system for a workpiece conveying apparatus of a transfer press machine, which is capable of changing a position and a posture of a workpiece holding tool (workpiece holding apparatus) with respect to the feed bar quickly with high accuracy without causing mistakes or the like in accordance with specifications (such as a shape, a size, and a material) of a workpiece to be held while suppressing an increase in weight of the feed bar.

Meanwhile, the workpiece conveying apparatus of the transfer press machine has increasingly been required to achieve high-speed conveyance of the workpiece.

Accordingly, also in the workpiece conveying apparatus of the transfer press machine proposed in Japanese Published Unexamined Patent Application No. 2019-081196 described above, it is intended to cope with high-speed conveyance of the workpiece by suppressing an increase in weight of the feed bar and weight of the workpiece holding tool (fingers) that is supported by the feed bar and can change the posture. However, when a workpiece conveying speed (in particular, reciprocating speed for advance and return) reaches a certain speed, in actuality, the entire feed bars resonates, with the result that a further increase in workpiece conveying speed is hindered.

SUMMARY OF THE INVENTION

According to at least one embodiment of the present invention, provided is a workpiece conveying system for a transfer press machine, including: a beam provided to extend in a feed direction of a workpiece; and a plurality of workpiece conveying apparatus supported by the beam, the plurality of workpiece conveying apparatus each including: a feed device, which includes a first carrier that is movable relative to the beam in the feed direction, and is configured to control the relative movement of the first carrier; a raising and lowering device, which includes a second carrier that is movable relative to the first carrier in a raising and lowering direction, and is configured to control the relative movement of the second carrier; a clamp device, which is supported on a lower end side of the second carrier, includes a third carrier that is movable relative to the second carrier in a clamp direction of clamping the workpiece, and is configured to control the relative movement of the third carrier; and at least one workpiece holding tool, which is supported at a distal end of the third carrier, and is configured to hold and release the workpiece.

In at least one embodiment of the present invention, the third carrier is a shaft-shaped member, and a long-axis direction of the third carrier extends in the clamp direction.

In at least one embodiment of the present invention, an outer peripheral spiral groove is formed in an outer periphery of the shaft-shaped member. The clamp device includes: a screw nut, which has an inner peripheral spiral groove to be engaged with the outer peripheral spiral groove through intermediation of balls for screw; and an electric motor for screw nut configured to rotationally drive the screw nut. The shaft-shaped member is moved relative to the second carrier in the clamp direction by rotating the screw nut in a predetermined direction through rotational drive of the electric motor for screw nut.

In at least one embodiment of the present invention, an outer peripheral spline groove is formed in an outer periphery of the shaft-shaped member so as to extend in a long-axis direction of the shaft-shaped member. The clamp device includes: a spline nut, which has an inner peripheral spline groove to be engaged with the outer peripheral spline groove through intermediation of balls for spline; and an electric motor for spline nut configured to rotationally drive the spline nut. The shaft-shaped member is rotated about the long axis relative to the second carrier by rotating the spline nut in a predetermined direction through rotational drive of the electric motor for spline nut.

In at least one embodiment of the present invention, an outer peripheral spiral groove and an outer peripheral spline groove, which extends in the long-axis direction, are formed in an outer periphery of the shaft-shaped member. The clamp device includes: a screw nut, which has an inner peripheral spiral groove to be engaged with the outer peripheral spiral groove through intermediation of balls for screw; and an electric motor for screw nut configured to rotationally drive the screw nut. The clamp device further includes: a spline nut, which has an inner peripheral spline groove to be engaged with the outer peripheral spline groove through intermediation of balls for spline; and an electric motor for spline nut configured to rotationally drive the spline nut. When the spline nut is rotated in a predetermined direction through rotational drive of the electric motor for spline nut so as to rotate the shaft-shaped member about the long axis relative to the second carrier, movement of the shaft-shaped member relative to the second carrier in the clamp direction, which is accompanied with relative rotation of the shaft-shaped member about the long axis, is absorbed (canceled) by rotating the screw nut in a predetermined direction through rotational drive of the electric motor for screw nut.

In at least one embodiment of the present invention, the plurality of workpiece conveying apparatus are separately and independently controllable.

BRIEF DESCRIPTION OF THE DRAWINGS

FIG. 2A is an enlarged perspective view for illustrating a part of a workpiece conveying system (left side of FIG. 1A) according to the embodiment to be used for the transfer press machine.

FIG. 4A is a sectional view for illustrating one configuration example of a clamp device to be used for a workpiece conveying apparatus in the embodiment (taken along a vertical plane always containing a rotation axis of a screw nut and a rotation axis of a spline nut).

FIG. 4B is a sectional view for illustrating a part of FIG. 4A taken along the line A-A of FIG. 4A.

FIG. 5A is a sectional view for illustrating an inner peripheral spiral groove formed in an inner periphery of the screw nut, balls for screw, and balls for spline by indicating a shaft of FIG. 4A with the two-dot chain line.

FIG. 5B is a sectional view for illustrating a part of FIG. 5A taken along the line A-A of FIG. 5A.

FIG. 6 is a view for illustrating conveying operations (Step "a" to Step "h") of workpiece conveying apparatus arranged so as to be opposed to each other in the workpiece conveying system according to the embodiment.

FIG. 8 is a front view (view seen from a direction along the workpiece conveying direction) for illustrating a clearance C given when a bolster and dies are brought to an outside preparation position from the workpiece conveying system.

FIG. 11 is a front view for illustrating an example of a case in which a crossbar is supported by the workpiece conveying apparatus in the workpiece conveying system.

FIG. 12A is a perspective view (state at a rotation angle of 0 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are offset from an imaginary rotation center VA.

FIG. 12B is a plan view (top view) of FIG. 12A.
FIG. 12C is a front view of FIG. 12A.
FIG. 12D is a left side view of FIG. 12C.
FIG. 12E is a right side view of FIG. 12C.

FIG. 13A is a perspective view (state at a rotation angle of 45 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are offset from the imaginary rotation center VA.

FIG. 13B is a plan view (top view) of FIG. 13A.
FIG. 13C is a front view of FIG. 13A.
FIG. 13D is a left side view of FIG. 13C.
FIG. 13E is a right side view of FIG. 13C.

FIG. 14A is a perspective view (state at a rotation angle of 90 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are offset from the imaginary rotation center VA.

FIG. 14B is a plan view (top view) of FIG. 14A.
FIG. 14C is a front view of FIG. 14A.
FIG. 14D is a left side view of FIG. 14C.
FIG. 14E is a right side view of FIG. 14C.

FIG. 15A is a perspective view (state at a rotation angle of 135 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are offset from the imaginary rotation center VA.

FIG. 15B is a plan view (top view) of FIG. 15A.

FIG. 15C is a front view of FIG. 15A.

FIG. 15D is a left side view of FIG. 15C.

FIG. 15E is a right side view of FIG. 15C.

FIG. 16A is a perspective view (state at a rotation angle of 180 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are offset from the imaginary rotation center VA.

FIG. 16B is a plan view (top view) of FIG. 16A.

FIG. 16C is a front view of FIG. 16A.

FIG. 16D is a left side view of FIG. 16C.

FIG. 16E is a right side view of FIG. 16C.

DESCRIPTION OF THE EMBODIMENTS

Now, with reference to the accompanying drawings, description is made of a workpiece conveying system (workpiece conveying apparatus) for a transfer press machine according to one embodiment of the present invention. The present invention is not limited to the embodiment described below.

The present invention has an object to provide a workpiece conveying system for a transfer press machine, which is capable of changing a position and a posture of a workpiece holding tool (workpiece holding apparatus) in accordance with, for example, specifications (such as a shape and a size) of a workpiece to be held, and a conveyance posture and a conveyance path to be required while contributing to high-speed conveyance of the workpiece with a relatively simple and low-cost configuration.

A transfer system 1 according to the embodiment of the present invention is a workpiece conveying system to be used for a transfer press machine 2, and is capable of achieving high-speed conveyance of a workpiece and eliminating need for replacement of a workpiece holding tool configured to hold the workpiece.

The transfer press machine 2 in this embodiment involves a plurality of steps (plurality of dies) in one press machine, and a workpiece conveying apparatus in this embodiment is a conveying apparatus configured to convey a workpiece between the steps. Therefore, the workpiece conveying apparatus in this embodiment are provided at least as many as the number of steps. However, the respective workpiece conveying apparatus are controllable separately and independently (mutually independently), and the specifications (such as the shape and the size) of the workpiece, the conveyance posture, and the conveyance path between the steps can be freely selected.

When a method of reciprocating a feed bar having a relatively long length and a large weight is employed as in a related-art workpiece conveying apparatus for a transfer press, the workpiece conveying apparatus in this embodiment reaches a limit at a relatively low level with regard to conveying speed. Thus, the workpiece conveying apparatus in this embodiment employs, in place of the configuration in which the feed bar is reciprocated, a system of providing a beam (bar) to extend in a workpiece conveying direction and moving the workpiece conveying apparatus on the extending beam.

Figure 1A:
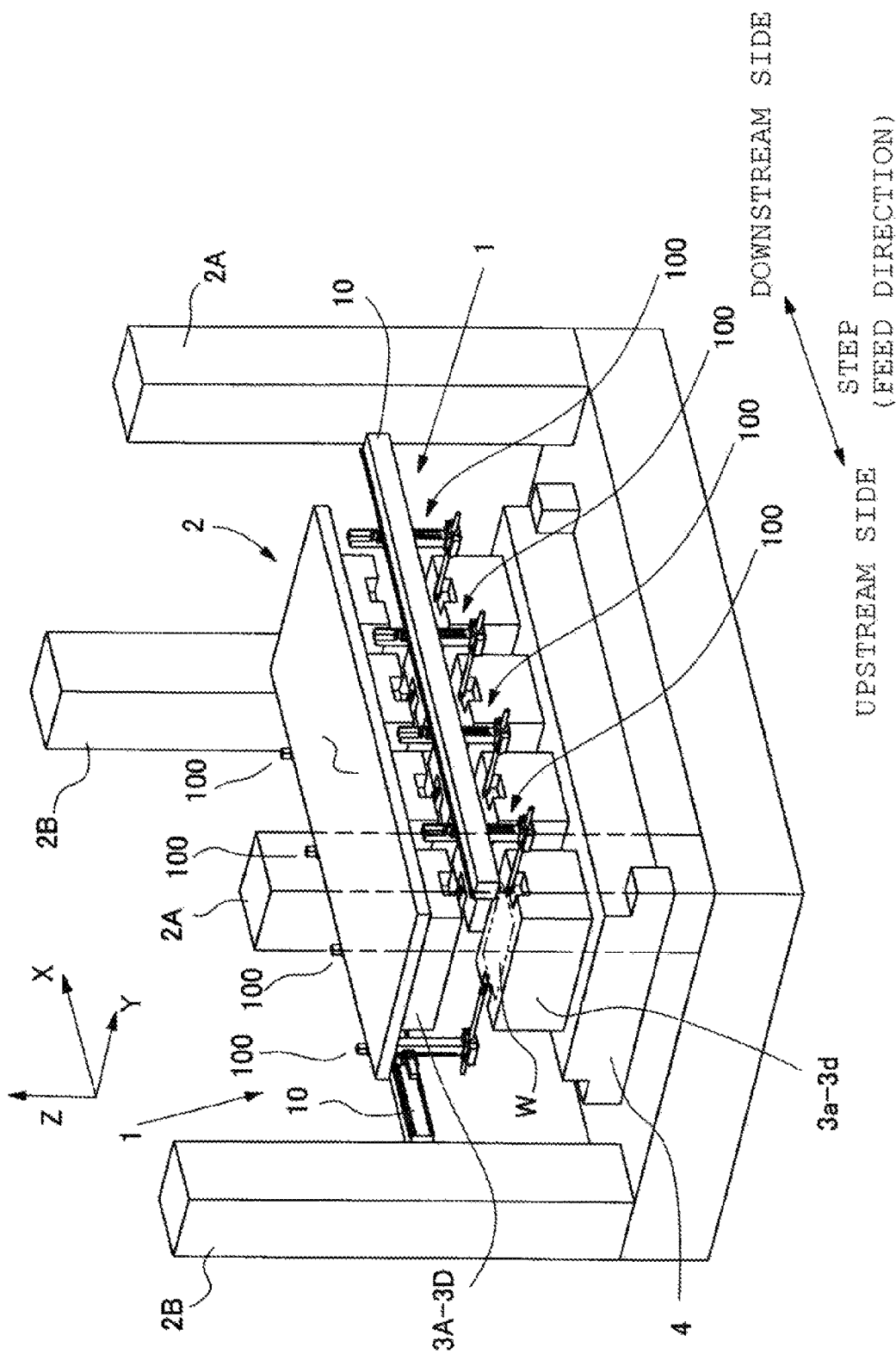
FIG. 1A is a perspective view for illustrating an overall configuration of a transfer press machine in one embodiment of the present invention.
Figure 1B:
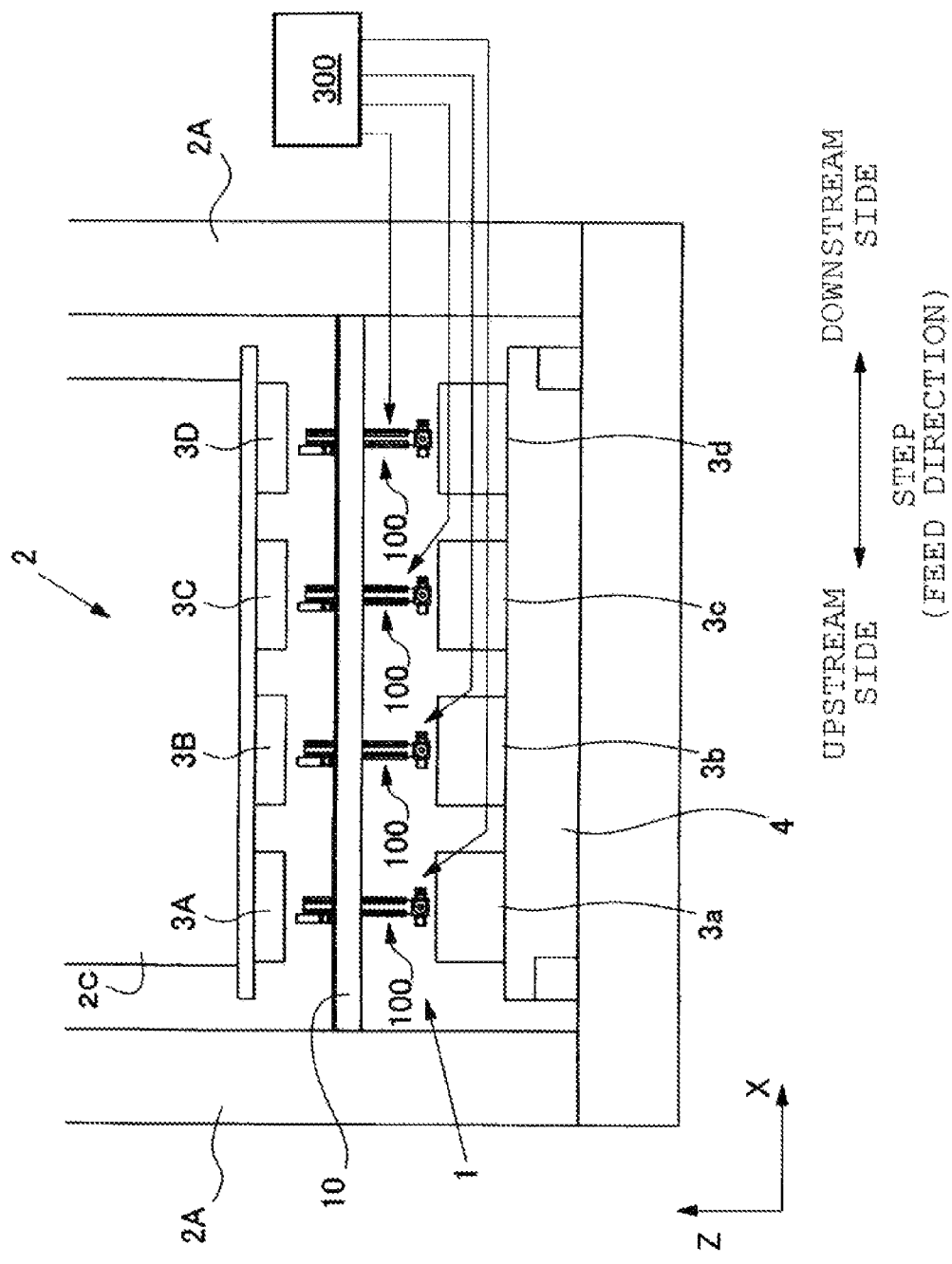
FIG. 1B is a view for illustrating the transfer press machine as seen from a horizontal direction orthogonal to a workpiece conveying direction.

As illustrated in FIG. 1A and FIG. 1B, the transfer system 1 according to this embodiment includes beams 10, and workpiece conveying apparatus 100 supported by the beams 10 so as to be movable. The workpiece conveying apparatus 100 can be arranged with the same number of steps (number of dies), for each beam 10.

Figure 2B:
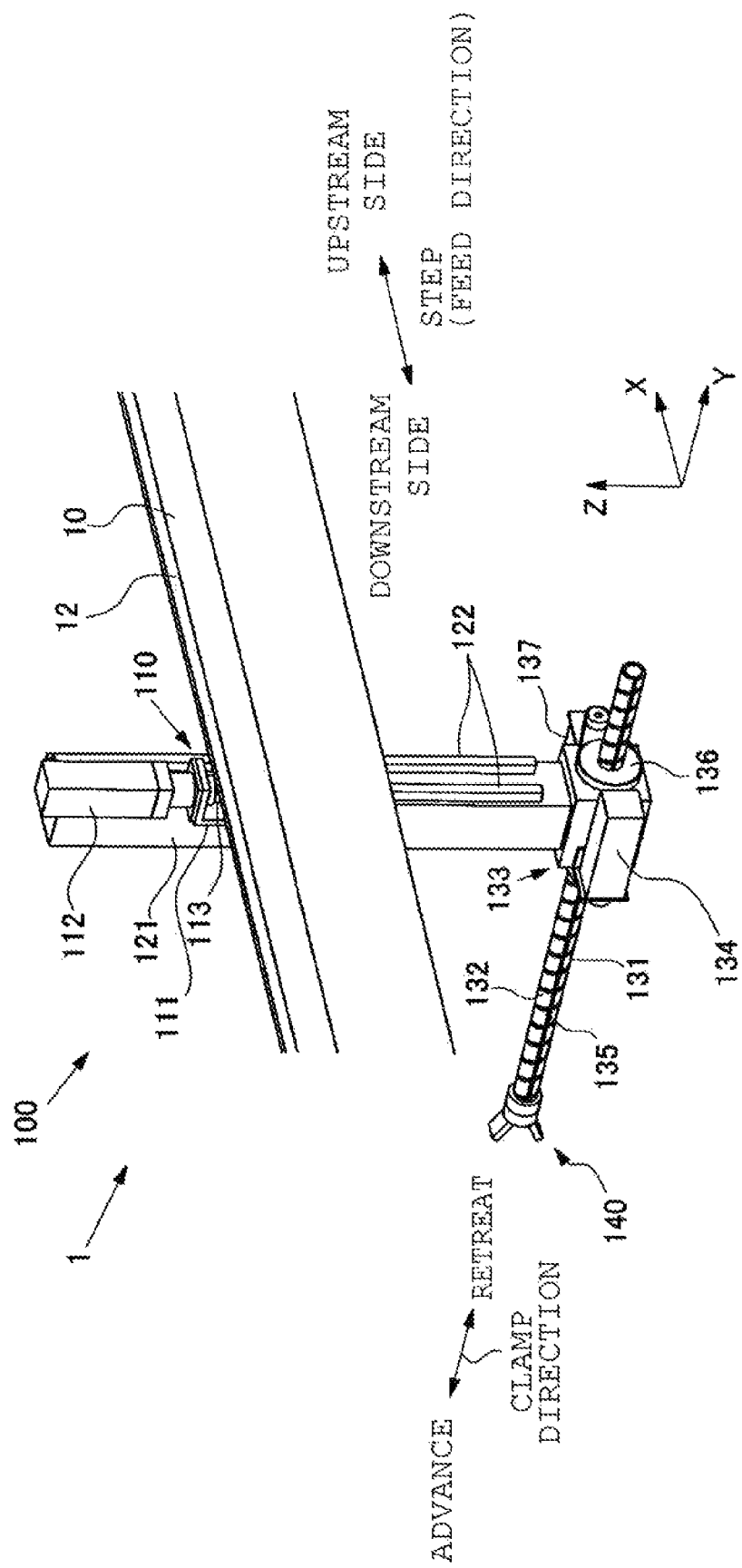
FIG. 2B is an enlarged perspective view for illustrating a part of the workpiece conveying system (right side of FIG. 1A) according to the embodiment to be used for the transfer press machine.

As illustrated in FIG. 2A and FIG. 2B, the workpiece conveying apparatus 100 in this embodiment can be moved straight (along an X axis, a Y axis, and a Z axis) and can be rotated about one axis. Here, the X axis corresponds to a feed direction (workpiece conveying direction), the Y axis corresponds to a clamp direction (clamp and unclamp direction), and the Z axis corresponds to a raising and lowering direction (lifting up and down direction). The workpiece conveying apparatus 100 is rotated (tilted) about the Y axis.

That is, the workpiece conveying apparatus 100 in this embodiment is a robot having four degrees of freedom.

More specifically, as illustrated in FIG. 1A, FIG. 1B, FIG. 2A, and FIG. 2B, the transfer system (workpiece conveying system) 1 according to this embodiment includes:

a beam (feed-direction bar) 10 provided to stretch between columns 2A and 2A (2B and 2B) aligned in the workpiece conveying direction of the transfer press machine 2; and a plurality of workpiece conveying apparatus (robots) 100 supported by (arranged on) the beam 10, the plurality of workpiece conveying apparatus (robots) 100 each including:
- a feed device 110, which includes a first carrier (feed-direction moving element) 111 that is movable (operable) relative to the beam 10 in a beam longitudinal direction (X);
- a raising and lowering device 120, which is mounted to the feed device 110, and includes a second carrier (raising-and-lowering-direction moving element) 121 that is movable (operable) relative to the feed device 110 in a raising and lowering direction (Z);
- a clamp device 130, which is mounted on a lower end side of the raising and lowering device 120, and includes a clamp part (clamp moving element or third carrier) 131 that is movable (operable) relative to the raising and lowering device 120 in a clamp direction (Y), the clamp part 131 being, for example, a shaft-shaped member (shaft upper member) configured to perform a clamp operation, an unclamp operation (Y), and rotation (revolution) about the Y axis; and
- at least one workpiece holding tool 140, which is supported at a distal end of the clamp part 131 of the clamp device 130 of each of the robots 100, and is configured to hold and release a workpiece W.

The workpiece conveying apparatus 100 can be arranged with the same number of steps (number of dies) for each beam 10 (in FIG. 1A and FIG. 1B, four pairs of workpiece conveying apparatus 100 are arranged so as to correspond to upper dies 3A to 3D (lower dies 3a to 3d)).

According to the workpiece conveying system 1 described above, the workpiece conveying apparatus (robot) 100 includes moving mechanisms corresponding to four axes, respectively, and includes one workpiece holding tool (gripper) 140 arranged at a distal end thereof (or on the workpiece side when the beam 10 side is defined as a proximal end). Thus, the position and posture of the workpiece holding tool (gripper) 140 (that is, workpiece) can be set to the desired (freely selected) position and posture on four axes (a position on each of three axes, that is, the X axis, the Y axis, and the Z axis and a rotation position about one axis (Y axis)).

Therefore, when each of the workpiece conveying apparatus (robots) 100 picks up the workpiece from the lower die for a previous step, for example, during conveyance of the workpiece to a subsequent step and at the time of releasing the workpiece to the lower die for the subsequent step, the position and posture of the workpiece holding tool (gripper) 140 (that is, workpiece) can be set to the desired (freely selected) position and posture with respect to the workpiece.

Here, in the press machine involving multiple steps, a distance (in the X direction) from the previous step to the subsequent step is small. Thus, the workpiece conveying apparatus (robot) 100 having a small length in the X direction is required.

Further, when the dies (upper dies 3A to 3D and lower dies 3a to 3d) are replaced, a moving bolster 4 is moved in the Y direction, thereby causing the dies (upper dies 3A to 3D and lower dies 3a to 3d) to come in and out of the press machine 2 in the Y direction (see FIG. 8).

At this time, it is preferred that the workpiece conveying apparatus (robots) 100 be capable of being raised to positions at which the workpiece conveying apparatus (robots) 100 are prevented from interfering with the dies.

In order to improve productivity (takt time) of the press machine, it is required that a part to be inserted in the dies (between the upper die and the lower die) have a small size. The part is inserted between the upper dies 3A to 3D and the lower dies 3a to 3d, which are moved up and down together with a slide 2C in a predetermined cycle, so as to take or put the workpiece, and hence the size of the part in an up-and-down direction (Z direction) has an influence on the takt time.

Thus, in the workpiece conveying apparatus (robot) 100 in this embodiment, only the clamp part 131 and the workpiece holding tool (gripper) 140 arranged on the distal end side of the clamp device 130 are inserted in the dies.

The clamp part 131 of the clamp device 130 has, for example, a shaft shape (elongated bar shape), has a small diameter, and has a shape advantageous for the clamp part 131 to come in and out of the dies.

In this embodiment, parts other than the clamp part 131 of the clamp device 130, that is, parts of the clamp device 130 arranged on the beam 10 side compared to the clamp part 131, the feed device 110, and the raising and lowering device 120 are laid outside a die area.

Now, a more specific configuration of the transfer system (workpiece conveying system) 1 according to this embodiment is described with reference to, for example, FIG. 1A, FIG. n, FIG. 2A, FIG. 2B, and FIG. 3.

As illustrated in FIG. 1A and FIG. 1B, the beam 10 is provided substantially integrally with the columns so as to stretch between the columns 2A and 2A (2B and 2B) of the transfer press machine 2.

On guide rails 11 mounted to the beam 10 along a longitudinal direction of the beam 10, the first carrier (feed-direction moving element or base portion) 111 of the feed device 110 of the workpiece conveying apparatus (robot) 100 is supported through intermediation of engagement elements 114 engaged with the guide rails 11 so as to be movable relative to the beam 10 along the feed direction (workpiece conveying direction) X.

Further, a rack gear 12 is mounted to the beam 10 so as to extend along the longitudinal direction (feed direction X) of the beam 10.

A pinion gear 113 meshes with the rack gear 12. The pinion gear 113 is fixed to a rotation output shaft of an electric motor 112 for feed serving as a drive source supported on the first carrier 111.

Thus, when the electric motor 112 for feed is rotated in a predetermined direction based on a drive control signal from a controller 300, the first carrier 111 of the feed device 110 is moved in a predetermined direction relative to the beam 10 along the feed direction (workpiece conveying direction) X through the pinion gear 113 and the rack gear 12.

A rotating direction of the electric motor 112 for feed is switched between a forward direction and a backward direction, thereby being capable of switching a moving direction of the first carrier 111 and the feed device 110 between a forward direction and a backward direction (capable of performing reciprocating linear motion).

However, in place of the drive mechanism such as the electric motor 112 for feed, the pinion gear 113, and the rack gear 12, another drive mechanism such as a linear motor can also be employed.

Next, in this embodiment, as illustrated in FIG. 1A to FIG. 3, the raising and lowering device 120 is supported by the first carrier (feed-direction moving element) 111 of the feed device 110 so as to be relatively movable along the raising and lowering direction (lift direction) Z.

The raising and lowering device 120 includes the second carrier (raising-and-lowering-direction moving element) 121 that can be formed of, for example, a hollow square pipe extending in the raising and lowering direction Z, and guide rails 122 are arranged on a side surface of the second carrier (raising-and-lowering-direction moving element) 121 along the raising and lowering direction Z.

That is, the second carrier (raising-and-lowering-direction moving element) 121 is supported by the first carrier (feed-direction moving element) 111 of the feed device 110 through intermediation of the guide rails 122 and engagement elements 115 so as to be relatively movable along the raising and lowering direction Z.

Further, a rack gear 123 is arranged on the second carrier (raising-and-lowering-direction moving element) 121 so as to extend in the longitudinal direction (raising and lowering direction Z) of the second carrier (raising-and-lowering-direction moving element) 121.

A pinion gear 124 meshes with the rack gear 123. The pinion gear 124 is fixed to a rotation output shaft of an electric motor 125 for raising and lowering (lift down) serving as a drive source supported on the first carrier 111.

Thus, when the electric motor 125 for raising and lowering is rotated in a predetermined direction based on a drive control signal from the controller 300, the second carrier 121 of the raising and lowering device 120 in this embodiment is moved in a predetermined direction relative to the first carrier 111 along the raising and lowering direction Z through the pinion gear 124 and the rack gear 123.

A rotating direction of the electric motor 125 for raising and lowering is switched between a forward direction and a backward direction, thereby being capable of switching a moving direction of the second carrier 121 between a forward direction and a backward direction (capable of performing a raising-and-lowering operation and a lift-down operation).

However, in place of a drive mechanism such as the electric motor 125 for raising and lowering, the pinion gear 124, and the rack gear 123, another drive mechanism such as a linear motor can also be employed.

Next, in this embodiment, as illustrated in FIG. 1A to FIG. 3, the clamp device 130 is supported at a vicinity of a lower end of the second carrier 121 of the raising and lowering device 120.

The clamp device 130 in this embodiment includes the clamp part (clamp moving element or third carrier) 131 that is configured to set a position of the workpiece holding tool (gripper) 140 in the Y direction and is movable (capable of advancing and retreating) to a position of clamping the workpiece.

Moreover, the clamp part 131 is configured to set a rotation posture (rotation angle position about the Y axis) of the workpiece holding tool (gripper) 140, and can perform rotary motion about the Y axis during workpiece conveyance.

In order to achieve this operation, two kinds of grooves are formed in an outer periphery of the clamp part 131 of the clamp device 130 in this embodiment.

First, the first groove is an outer peripheral spiral groove (thread groove) 132 formed in a spiral shape in the outer periphery of the shaft-shaped clamp part 131. A screw nut (nut for thread groove or ball screw nut) 133 is mounted to a main body side of the clamp device 130. Balls (balls for screw) to be threadedly engaged (engaged) with the outer peripheral spiral groove 132 are fitted in the screw nut 133.

When, based on a drive control signal from the controller 300, the screw nut 133 is rotated with respect to the main body of the clamp device 130 in a predetermined direction by an electric motor 134 for screw nut (electric motor for ball screw nut) serving as a drive source, through the balls (balls for screw) and the outer peripheral spiral groove 132, the shaft (clamp part) 131 is moved straight in a predetermined direction with respect to the main body along the clamp direction (Y direction) (the distal end of the shaft (clamp part) 131 is moved with respect to the workpiece so as to be capable of advancing and retreating). At the time of the straight movement, the shaft (clamp part) 131 performs only rectilinear motion without rotating (tilting) about a long-axis center (Y axis). Under this state, the shaft (clamp part) 131 is supported in a fixed manner by an electric motor 137 for spline nut, which is described later, so as to be prevented from rotating about the long-axis center (Y axis).

A rotating direction of the electric motor 134 for screw nut is switched between a forward direction and a backward direction, thereby being capable of switching (performing reciprocating linear motion) a straight moving direction of the shaft (clamp part) 131 between a forward direction and a backward direction (reciprocating linear motion).

The second groove is outer peripheral spline grooves (straight grooves) 135 formed in the outer periphery of the shaft-shaped clamp part 131 so as to extend in the longitudinal direction of the shaft. A spline nut (nut for spline groove or ball spline nut) 136 is mounted on the main body side of the clamp device 130. Balls (balls for spline) to be threadedly engaged (engaged) with the outer peripheral spline grooves 135 are fitted in the spline nut 136.

When, based on a drive control signal from the controller 300, the spline nut 136 is rotated with respect to the main body of the clamp device 130 in a predetermined direction by the electric motor 137 for spline nut serving as a drive source, through the balls (balls for spline) engaged with the spline grooves 135 and the spline nut 136, the shaft (clamp part) 131 is rotated about the long-axis center (Y axis) in a predetermined direction relative to the main body. At the time of the rotary motion, the shaft (clamp part) 131 performs only the rotary motion (tilting motion) without translationally moving in the longitudinal direction (clamp direction) Y.

The reason why the shaft (clamp part) 131 can perform only the rotary motion (tilting motion) without translationally moving in the longitudinal direction (clamp direction) Y is described below. When the shaft 131 is caused to perform the rotary motion (tilting motion) about the Y axis, due to the rotary motion of the shaft 131, the screw nut 133 supported in a fixed manner on the second carrier 121 side (which is because the electric motor 134 for screw nut is being stopped) acts so that the shaft 131 is prone to translationally move in the clamp direction by an amount corresponding to an angle of the rotary motion. However, the controller 300 causes the electric motor 134 for screw nut to rotate in a predetermined direction so as to cancel the translational movement.

In other words, when the shaft (clamp part) 131 is caused to perform the rotary motion (tilting motion), the controller 300 drives the electric motor 134 for screw nut in association with drive of the electric motor 137 for spline nut (drive for performing the rotary motion (tilting motion)) so as to cancel the amount of the translational movement of the shaft (clamp part) 131.

A rotating direction of the electric motor 137 for spline nut is switched between a forward direction and a backward direction, thereby being capable of switching the rotating direction of the shaft (clamp part) 131 and the workpiece holding tool (gripper) 140 between a forward direction and a backward direction (capable of performing reciprocating rotary motion or swinging).

Now, a configuration of the clamp device 130 in this embodiment is described with reference to FIG. 4A, FIG. 4B, FIG. 5A, and FIG. 5B.

FIG. 4A and FIG. 4B are views for illustrating a state in which the clamp part (shaft) 131 is mounted to the clamp device 130. Here, in FIG. 4A and FIG. 4B, there is illustrated a cross section of the clamp device 130 taken along a vertical plane always containing a rotation axis of the screw nut 133 and a rotation axis of the spline nut 136. In FIG. 4A and FIG. 4B, not a cross section of the shaft 131 but an outer peripheral surface thereof is illustrated.

FIG. 5A and FIG. 5B are views for illustrating an inner peripheral spiral groove 507 formed in an inner surface (inside diameter surface) of the screw nut 133, balls 502A for screw, and balls 502B for spline by indicating the shaft 131 of FIG. 4A and FIG. 4B with the two-dot chain line.

<Outline of Configuration of Clamp Device 130>

The shaft 131 is supported so as to be freely rotatable, and is surrounded by the screw nut 133 and the spline nut 136 each having an annular shape.

The screw nut 133 and the spline nut 136 are supported and surrounded by a screw-side housing 504A and a spline-side housing 504B, respectively, each having an annular shape.

The screw-side housing 504A and the spline-side housing 504B are integrally fixed and mounted to the second carrier 121 through intermediation of a nut support portion 505.

FIG. 4A, FIG. 4B, FIG. 5A, and FIG. 5B are sectional views, and hence the screw nut 133, the spline nut 136, the screw-side housing 504A, the spline-side housing 504B, and the nut support portion 505 each having an annular shape are illustrated in a divided manner in the drawings.

The spline nut 133 is supported in the screw-side housing 504A through intermediation of a screw-side bearing 503A so as to be rotatable.

The spline nut 136 is supported in the spline-side housing 504B through intermediation of a spline-side bearing 503B so as to be rotatable.

In the inner surface (inside diameter surface) of the screw nut 133, the inner peripheral spiral groove 507 is formed so as to have the same lead angle as that of the outer peripheral spiral groove 132 formed in the outer peripheral surface (outside diameter surface) of the shaft 131.

The plurality of balls 502A for screw, which are fitted in the outer peripheral spiral groove 132 so as to be freely rotatable, are fitted also in the inner peripheral spiral groove 507. That is, the shaft 131 and the screw nut 133 are engaged with each other through the outer peripheral spiral groove 132, the balls 502A for screw, and the inner peripheral spiral groove 507.

The balls 502A for screw are arrayed so as to circulate in the outer peripheral spiral groove 132 and the inner peripheral spiral groove 507 along, for example, a path (not shown) extending from one end to another end of the screw nut 133 via an inside thereof.

In the inner surface (inside diameter surface) of the spline nut 136, the inner peripheral spline groove 506 is formed at a position corresponding to that of the outer peripheral spline groove 135 formed in the outer peripheral surface (outside diameter surface) of the shaft 131.

The plurality of balls 502B for spline, which are fitted in the outer peripheral spline groove 135 are fitted also in the inner peripheral spline groove 506. That is, the shaft 131 and the spline nut 136 are engaged with each other through the outer peripheral spline groove 135, the balls 502B for spline, and the inner peripheral spline groove 506.

The balls 502B for spline are arrayed so as to circulate in the outer peripheral spline groove 132 and the inner peripheral spline groove 507 along, for example, a path (not shown) extending from one end to another end of the spline nut 136 via an inside thereof.

Further, a pulley 500A for screw nut is mounted integrally with the screw nut 133.

Similarly to the screw nut 133, the pulley 500A for screw nut is arranged around the shaft 131.

The rotary motion of the electric motor 134 for screw nut is transmitted to the pulley 500A for screw nut via a belt 501A for screw nut. Thus, the screw nut 133 is rotated around the shaft 131.

Meanwhile, a pulley 500B for spline nut is also mounted integrally with the spline nut 136.

Similarly to the spline nut 136, the pulley 500B for spline nut is arranged around the shaft 131.

The rotary motion of the electric motor 137 for spline nut is transmitted to the pulley 500B for spline nut via a belt 501B for spline nut. Thus, the spline nut 136 is rotated around the shaft 131.

<Moving Motion of Shaft 131 in Clamp Direction>

(1) The rotary motion of the electric motor 134 for screw nut is transmitted to the pulley 500A for screw nut via the belt 501A for screw nut.

(2) The pulley 500A for screw nut is rotated.

(3) The screw nut 133 integrated with the pulley 500A for screw nut is also rotated.

(4) Along with the rotation of the screw nut 133, a train of the balls 502A for screw fitted in the inner peripheral spiral groove 507 is also rotated in the same direction as the screw nut 133 (rotated about an axis of the shaft 131).

(5) Due to the rotation of the item (4), the shaft 131, which has a threadedly-engaging relationship with the train of the balls 502A for screw, receives rotating action α about the axis of the shaft 131 and moving action β along the clamp direction.

(6) However, the rotary motion of the shaft 131 is inhibited by the plurality of balls 502B for spline fitted in the outer peripheral spline grooves 135 of the shaft 131. This is because, at this time, the electric motor 137 for spline nut is stopped, and hence the spline nut 136 is not rotated.

(7) Meanwhile, movement of the shaft 131 in the clamp direction is not limited.

(8) In other words, when the rotating action α of the screw nut 133 is transmitted to the balls 502A for screw via the inner peripheral spiral groove 507 as in the item (3), the balls 502A for screw receive the rotating action α of the screw nut 133 and the moving action β along the clamp direction. Here, as described in the item (6), the rotary motion of the shaft 131 is inhibited, and hence the rotating action α is ineffective to the shaft 131. Meanwhile, movement of the shaft 131 in the clamp direction is not limited, and hence the moving action β is effective.

(9) Owing to the effective moving action β, the shaft 131 is moved in the clamp direction (translationally moved) while the outer peripheral spiral groove 132 of the shaft 131 maintains an overlapping positional relationship with the inner peripheral spiral groove 507 (through intermediation of the balls 502A for screw).

<Tilting Motion of Shaft 131>

(1) The rotary motion of the electric motor 137 for spline nut is transmitted to the pulley 500B for spline nut via the belt 501B for spline nut.

(2) The pulley 500B for spline nut is rotated.

(3) The spline nut 136 integrated with the pulley 500B for spline nut is also rotated.

(4) Along with the rotation of the spline nut 136, a train of the balls 502B for spline fitted in the inner peripheral spiral groove 506 also receives rotating action γ in the same direction as the spline nut 136 (rotated about the axis of the shaft 131).

(5) Due to the rotary motion of the train of the balls 502B for spline of the item (4), the shaft 131 performs the tilting motion.

However, the outer peripheral spiral groove 132 is formed in the shaft 131, and hence the balls 502A for screw receive moving action δ along the clamp direction of the shaft 131.

(6) Here, it is assumed that the screw nut 133 is kept stopped during the tilting motion of the shaft 131. In this case, the screw nut 133 is not rotated, and hence the inner peripheral spiral groove 507 of the screw nut 133 is not rotated.

(7) Therefore, the moving action δ acting on the balls 502A for screw along with the tilting motion of the shaft 131 is received by the shaft 131 as a reaction. As a result, the shaft 131 is prone to be moved along the clamp direction.

(8) In this condition, the workpiece holding tool (gripper) 140 cannot be controlled to a desired position along with the tilting motion of the shaft 131.

(9) Thus, the screw nut 133 is rotated in combination with the tilting motion described above. For example, the screw nut 133 is rotated at desired timing in the same direction as the rotating direction of the shaft 131. With this control, even when the balls 502A for screw receive the moving action δ described in the item (5), the outer peripheral spiral groove 132 and the inner peripheral spiral groove 507 can maintain the overlapping positional relationship so as to absorb the moving action δ (cancel the moving action δ).

(10) As a result of the item (9), even when the moving action δ acts on the balls 502A for screw along with the tilting motion of the shaft 131, the shaft 131 does not receive the reaction.

(11) Thus, even when the shaft 131 performs the tilting motion, the shaft 131 is not moved in the clamp direction, thereby being capable of controlling the workpiece holding tool (gripper) 140 to a desired position.

That is, according to the clamp device 130 in this embodiment, the clamp part (shaft) 131 and the workpiece holding tool (gripper) 140 can be moved (translationally moved) to a desired position in the clamp direction (Y), and can be caused to perform predetermined rotary motion (tilting motion) (rotation about the Y axis) while maintaining the position in the clamp direction (Y).

However, when the electric motor 134 for screw nut and the electric motor 137 for spline nut are driven to rotate independently of each other without cooperation, the shaft (clamp part) 131 can also be translationally moved in the clamp direction (Y direction) (caused to perform so-called spiral motion) while being rotated about the long-axis center (Y axis).

The clamp device 130 configured as described above can perform two types of drive (translational moving drive and rotational drive) with a lightweight and compact configuration, and can contribute to high-speed conveyance and improvement of production efficiency of the press machine.

Figure 3:
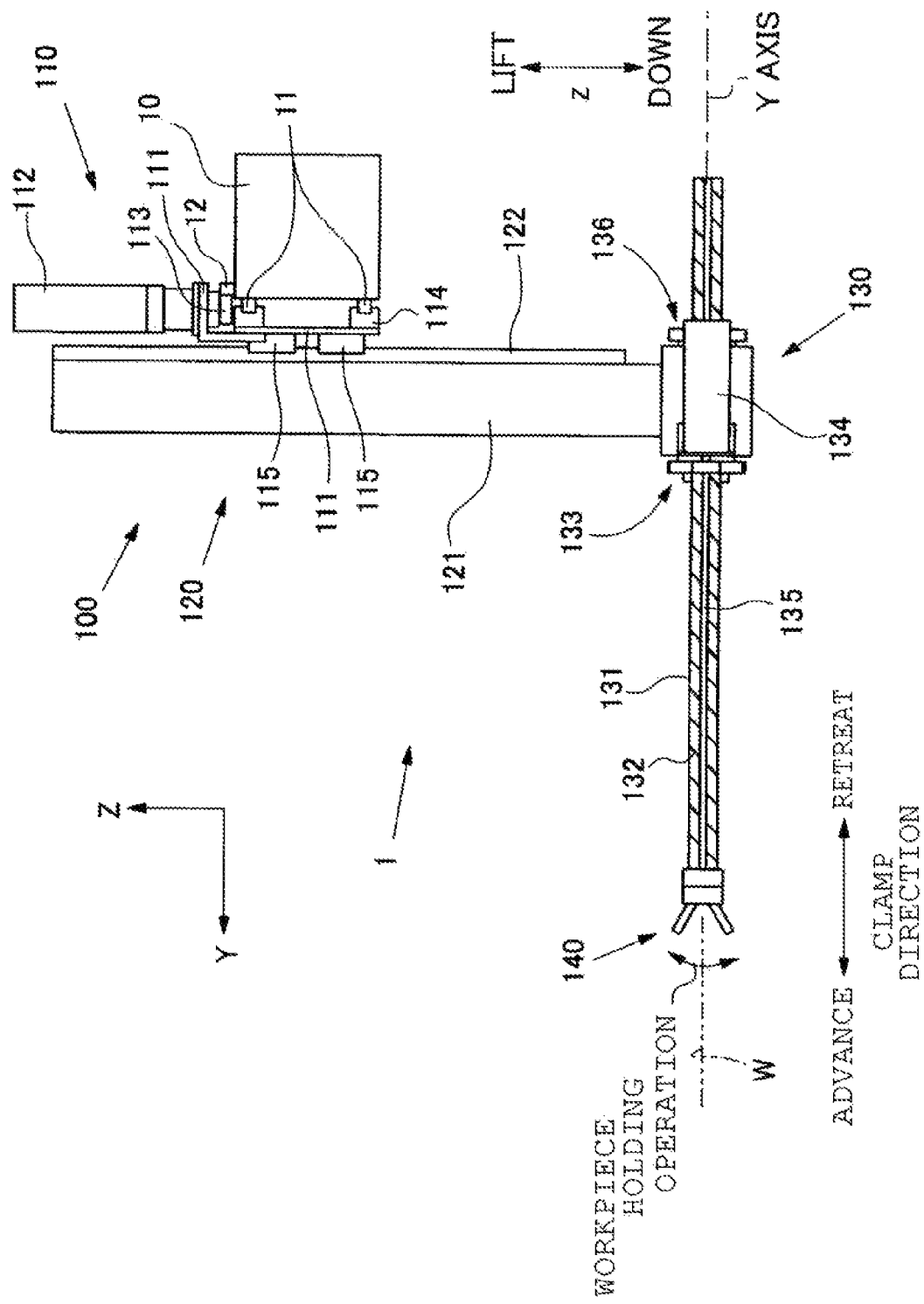
FIG. 3 is a view for illustrating the workpiece conveying system of FIG. 2B as seen from an upstream side toward a downstream side in the workpiece conveying direction.

As illustrated in, for example, FIG. 2A, FIG. 2B, and FIG. 3, the workpiece holding tool (gripper) 140 may include, for example, fingers configured to hold the workpiece and release the workpiece based on a drive control signal from the controller 300. However, there may also be employed a workpiece holding tool configured to hold and release the workpiece through vacuum suction or magnetic attraction. As a drive source for the workpiece holding tool (gripper) 140, for example, fluid pressure such as air pressure or oil pressure can be used, and the fluid pressure can be fed to, for example, an operating portion of the workpiece holding tool (gripper) 140 through an internal space of the shaft (clamp part) 131 having a hollow cylindrical shape.

The transfer system (workpiece conveying system) 1 according to this embodiment configured as described above can operate the workpiece conveying apparatus (robots) 100 based on a control signal from the controller 300 (see FIG. 1B), for example, in the following manner.

However, the workpiece conveying apparatus (robots) 100 are controlled so as to operate in conjunction with a pressing operation of the press machine 2, and the operations of the workpiece conveying apparatus (robots) 100 are controllable separately and independently (mutually independently). For example, moving amounts (such as feed amounts, lift amounts, or moving amounts for clamp) of the workpiece conveying apparatus (robots) 100 and a conveyance posture of the workpiece can be controlled so as to vary as appropriate in accordance with the pressing operation of the press machine 2 (for example, variation in dies and steps).

<Workpiece Conveying Operation> (See FIG. 6)

First, in Step "a" (see the reference symbol "a" of FIG. 6), the electric motor 134 is rotated in a predetermined direction so as to translationally move the clamp part 131 of the clamp device 130 of each workpiece conveying apparatus (robot) 100, thereby causing the workpiece holding tool (gripper) 140 at the distal end of the clamp device 130 to advance in the clamp direction Y to a predetermined position (position of taking up the workpiece) (pickup position).

In Step "b" (see the reference symbol "b" of FIG. 6) subsequent to Step "a", the workpiece holding tool (gripper) 140 holds the workpiece.

In Step "c" (see the reference symbol "c" of FIG. 6), the electric motor 125 for raising and lowering is rotated in a predetermined direction so as to raise the second carrier 121 of the raising and lowering device 120 of each workpiece conveying apparatus (robot) 100 in the raising and lowering direction (Z direction), thereby raising the workpiece holding tool (gripper) 140 at the distal end of the clamp device 130 and the workpiece to a predetermined height position.

In Step "d" (see the reference symbol "d" of FIG. 6), the electric motor 112 for feed is rotated in a predetermined direction so as to move the first carrier 111 of the feed device 110 of each workpiece conveying apparatus (robot) 100 in the feed direction (workpiece conveying direction: X direction), thereby moving the workpiece holding tool (gripper) 140 at the distal end of the clamp device 130 and the workpiece to a die position (predetermined position or workpiece releasing position) for the subsequent step (next step).

In Step "e" (see the reference symbol "e" of FIG. 6), the electric motor 125 for raising and lowering is rotated in a predetermined direction (direction reverse to that in Step "c") so as to lower the second carrier 121 of the raising and lowering device 120 of each workpiece conveying apparatus (robot) 100 in the raising and lowering direction (Z direction), thereby lowering the workpiece holding tool (gripper) 140 at the distal end of the clamp device 130 and the workpiece to a predetermined height position.

In Step "f" (see the reference symbol "f" of FIG. 6), the workpiece is released from each workpiece holding tool (gripper) 140, and is fed to the lower die for a downstream step.

In Step "g" (see the reference symbol "g" of FIG. 6), the electric motor 134 is rotated in a predetermined direction (direction reverse to that in Step "a") so as to translationally move the clamp part 131 of the clamp device 130 of each workpiece conveying apparatus (robot) 100, thereby causing the workpiece holding tool (gripper) 140 at the distal end of the clamp device 130 to retreat (retract) in the clamp direction Y to a predetermined position (position for returning to the previous step or unclamp position).

In Step "h" (see the reference symbol "h" of FIG. 6), the electric motor 112 for feed is rotated in a predetermined direction (direction reverse to that in Step "d") so as to move the first carrier 111 of the feed device 110 of each workpiece conveying apparatus (robot) 100 in a return direction (toward an upstream side in the workpiece conveying direction), thereby moving (returning) the workpiece holding tool (gripper) 140 at the distal end of the clamp device 130 and the workpiece to a die position (predetermined position) for the previous step (upstream step).

In this embodiment, through repetition of operations in Step "a" to Step "h", the workpiece is conveyed between steps in the transfer press machine 2 (among the lower dies 3a to 3d).

The workpiece conveying apparatus (robots) 100, which are arranged so as to be opposed to each other across a workpiece conveyance center, are paired, but a conveyance path can be freely set for each step.

As described above, in this embodiment, unlike the related-art apparatus configured to convey the workpiece by moving the entire feed bars with a configuration in which the feed bars each have a large weight and a long length and support workpiece holding tools, the plurality of workpiece conveying apparatus (robots) 100 each having a lightweight and compact configuration are provided, and the workpiece is conveyed by separately and independently (mutually independently) moving the plurality of workpiece conveying apparatus (robots) 100 on the beams (feed-direction bars) 10 extending in the feed direction. Thus, the present invention does not have a problem of the related art in which, when workpiece conveying speed reaches certain speed, the entire feed bars resonate to hinder a further increase in workpiece conveying speed. Accordingly, the present invention can contribute to an increase in workpiece conveying speed.

In addition, by the workpiece conveying apparatus (robot) 100 having a lightweight and compact configuration, the workpiece holding tool 140 can be moved in directions of three axes, that is, the feed direction (X direction), the clamp direction (Y direction), and the raising and lowering direction (Z direction), and the workpiece holding tool 140 can be rotated about the Y axis. Thus, the present invention can change the position and posture of the workpiece holding tool (workpiece holding apparatus) to the desired position and posture in accordance with the specifications (such as the shape, the size, and a material) of the workpiece to be held while contributing to high-speed conveyance of the workpiece.

That is, according to this embodiment, the present invention can provide the workpiece conveying system (workpiece conveying apparatus) for a transfer press machine, which is capable of changing the position and posture of the workpiece holding tool (workpiece holding apparatus) in accordance with, for example, the specifications (such as the shape, the size, and the material) of the workpiece to be held, and the conveyance posture and the conveyance path to be required while contributing to high-speed conveyance of the workpiece with the relatively simple and low-cost configuration.

In this embodiment, the feed device 110 is mounted to the beam (feed-direction bar) 10, which is provided to extend in the workpiece conveying direction (feed direction) X, so as to be movable in the extending direction of the beam 10. The raising and lowering device 120 is mounted to the main body (first carrier or feed-direction moving element) 111 of the feed device 110 so as to be movable in the up-and-down direction (lifting up and down direction) Z. The clamp device 130 is mounted to the main body (second carrier or raising-and-lowering-direction moving element) 121 of the raising and lowering device 120 so as to be movable in the clamp direction (clamping and unclamping direction) Y. The workpiece holding tool 140 configured to hold and release the workpiece is mounted to the distal end of the clamp part (third carrier or clamp moving element) 131 of the clamp device 130. With this configuration, a variety of operations and effects described below can be obtained.

(A) Replacement of the workpiece holding tool in accordance with the specifications (such as the shape and the size) of the workpiece, or work for adjustment of the position and posture of the workpiece holding tool is not required.

Figure 7A:
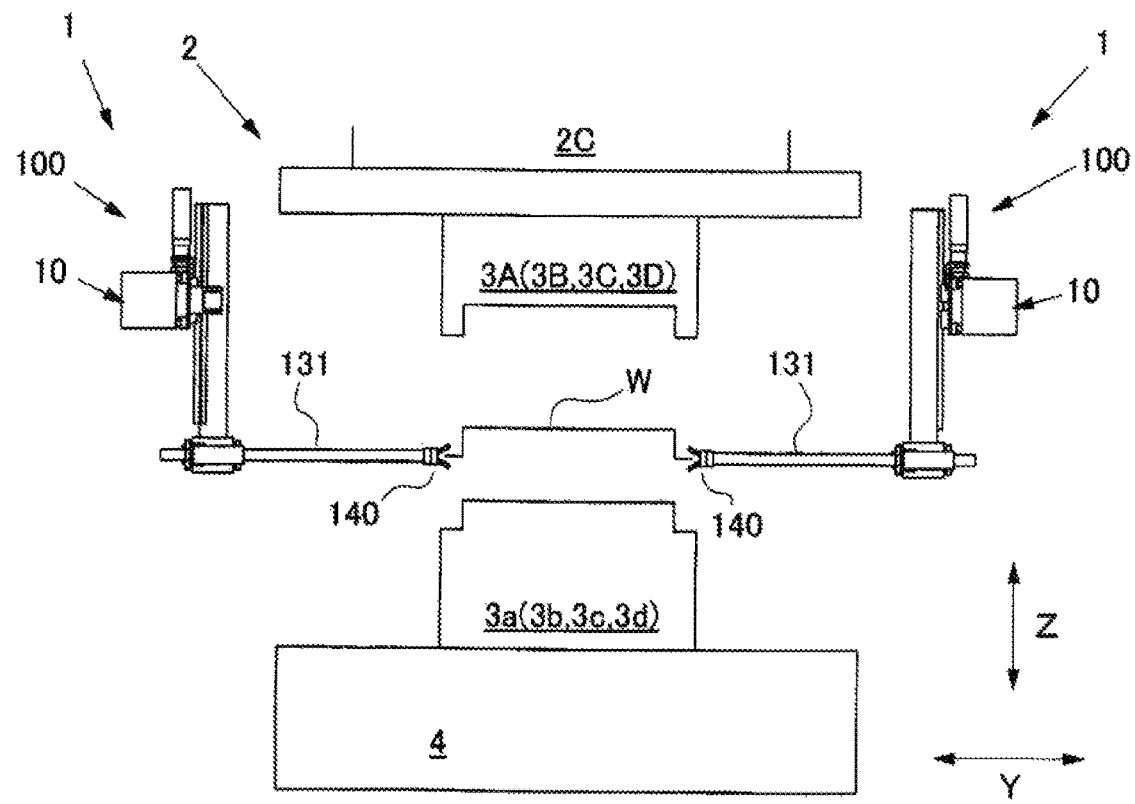
FIG. 7A is a view for illustrating a state in which positions of workpiece holding tools are controlled to conform to a case in which a workpiece W having a relatively small size is held by the workpiece conveying apparatus.
Figure 7B:
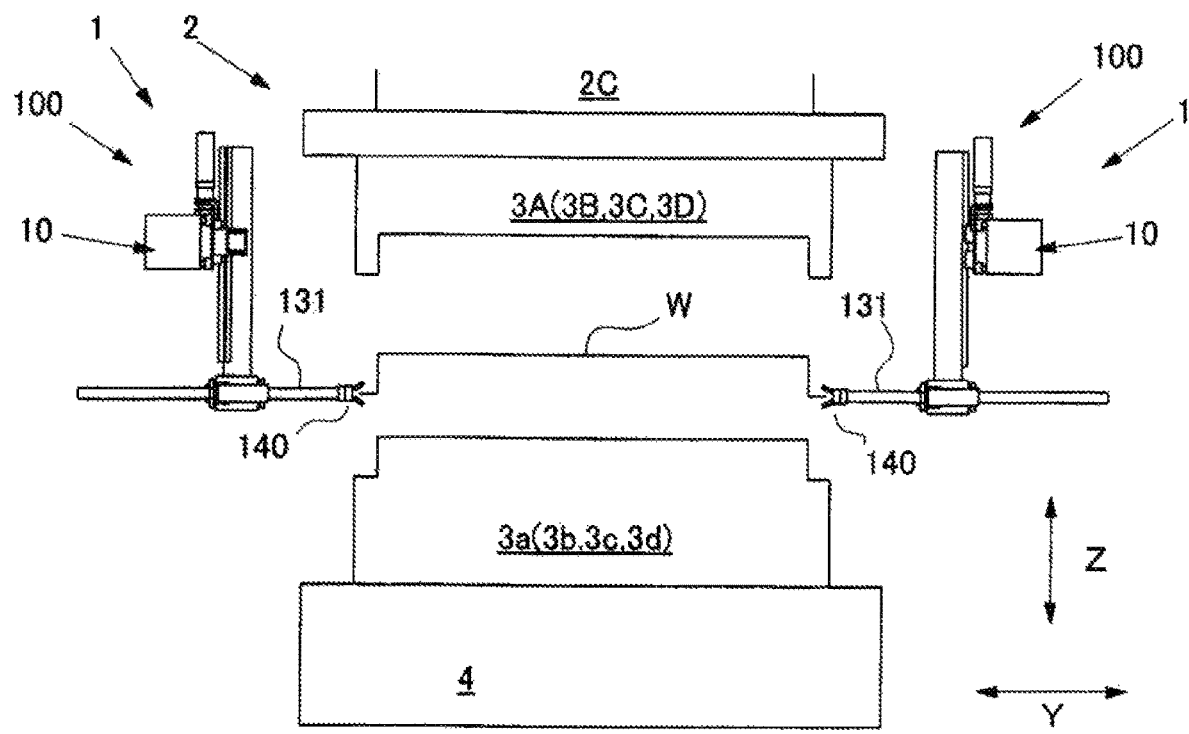
FIG. 7B is a view for illustrating a state in which the positions of the workpiece holding tools are controlled to conform to a case in which a workpiece W having a relatively large size is held by the workpiece conveying apparatus.

That is, according to this embodiment, for example, as illustrated in FIG. 7A and FIG. 7B, in accordance with, for example, the shape of the workpiece formed in each step and positions of the dies, each of the workpiece conveying apparatus (robots) 100 arranged for each step (each workpiece) can set (change) the position of the workpiece holding tool (gripper) 140 (X, Y, and Z coordinates and a tilt angle) to the freely selected position separately and independently (mutually independently). The tilt refers to rotation about the Y axis (angle position).

More specifically, in the related-art workpiece conveying apparatus for a transfer press, it is required to change the tool (workpiece holding tool) conforming to the shape of the workpiece every time the dies are changed.

That is, the transfer press has a plurality of steps in the slide. Thus, the dies required for the steps, and transfer tools are replaced so as to be capable of holding the workpiece varying in shape along with progress of press working.

The transfer tools are replaced in an outside preparation region (see FIG. 8). However, the number of the tools is large, and thus replacement work takes time.

Further, there are many kinds of products to be formed by the press machine, and it is required to store the dies and the transfer tools collectively for each of the products. A space is required to store the tools. Further, cost is high when the tools required for the products are manufactured. Tool replacement is performed manually, and hence the tools or the dies are damaged when the tools are mounted wrongly.

In contrast, according to this embodiment, the workpiece conveying apparatus (robots) 100 are controllable separately and independently (mutually independently), and hence conveying motion (performed to, for example, separate and tilt the workpiece) among the steps can be freely set in accordance with, for example, a shape of the workpiece so as to differ from each other, thereby being capable of improving a degree of freedom in die design. That is, the position of the workpiece holding tool (gripper) 140 (X, Y, and Z coordinates and a tilt angle) can be set to the freely selected position independently, thereby being capable of solving the above-mentioned problem of the related art.

(B) The present invention can contribute to suppression of bending of the shaft-shaped clamp part (clamp moving element) 131 accompanied with a change of the specifications of the workpiece.

That is, as illustrated in FIG. 7A, when the workpiece W has a relatively small shape (has a small length in the Y direction), the workpiece W itself has a small weight. Thus, even when a distance between a position of gripping the workpiece W and a point of supporting the shaft 131 becomes larger as a result of advance of the shaft-shaped clamp part (hereinafter, also referred to as a shaft) 131, bending of the shaft 131 is suppressed.

Conversely, as illustrated in FIG. 7B, when the workpiece W has a relatively large shape (has a large length in the Y direction), the workpiece W itself has a large weight. However, the distance between the position of gripping the workpiece W and the point of supporting the shaft 131 becomes smaller as a result of retreat of the shaft 131. Thus, even in this case, bending of the shaft 131 is suppressed.

That is, according to this embodiment, irrespective of the size of the shape of the workpiece W (the length in the Y direction), the shaft 131 performs motion of suppressing bending in itself. Thus, a diameter of the shaft 131 can be reduced. Along with this, the gripper 140 may be downsized. Consequently, a risk of interference between the third carrier and the die can also be reduced.

(C) All the workpiece conveying apparatus (robots) 100 can separately and independently (mutually independently) repeat a series of operations including, for example, clamping, raising, conveying/feeding, lowering, unclamping, conveying/returning, and clamping the workpiece, which are performed in the stated order.

That is, all the workpiece conveying apparatus (robots) 100 can separately and independently (mutually independently) control the various operations. Thus, the conveying operations of the workpiece conveying apparatus (robots) 100 can be performed in the same and synchronized manner. Alternatively, when the conveying operations are performed in the same manner, the conveying operations can be unsynchronized. Further, conveyance paths (a path for feed and a path for return) of the workpiece holding tools (grippers) 140 can be set to differ from each other.

(D) Advantages are given at the time of replacement of the dies.

When the dies (upper dies 3A to 3D and lower dies 3a to 3d) are replaced, the moving bolster 4 is moved in the Y direction, thereby causing the dies (upper dies 3A to 3D and lower dies 3a to 3d) to come in and out of the press machine 2 in the Y direction. In this manner, the dies are replaced with another dies (see FIG. 8). At this time, each of the workpiece conveying apparatus (robots) 100 in this embodiment can be raised to a position at which each of the workpiece conveying apparatus (robots) 100 is prevented from interfering with the die (height at which the clearance C can be obtained) owing to a configuration in which the raising and lowering device 120 is mounted to the feed device 110 so as to obtain a large lift amount (see FIG. 8).

With this configuration, the die replacement work can be performed in a region where the dies are taken out of the press machine 2 and the work (outside preparation) is easily performed, thereby being capable of easily performing the die replacement work.

Owing to the layout configuration of this embodiment in which the feed device 110 is mounted to the beam 10 provided to extend in the workpiece conveying direction (feed direction) X, in which the raising and lowering device 120 is mounted to the feed device 110, in which the clamp device 130 is mounted to the raising and lowering device 120, and in which the workpiece holding tool 140 is mounted to the clamp device 130, large strokes (feed operation amount, lift operation amount, and clamp operation amount) can be obtained while high-speed conveyance in the feed direction can be achieved. In a case of employing, for example, another layout configuration in which one of the raising and lowering device 120 and the clamp device 130 is mounted to a stationary side (line base, which corresponds to the beam 10 in this embodiment) so as to serve as a first moving mechanism, and another one of the raising and lowering device 120 and the clamp device 130, or the beam 10 and the feed device are mounted to the one of the raising and lowering device 120 and the clamp device 130, the moving mechanism having a large weight is mounted to a position far from the proximal end side (line base). Thus, this configuration requires an increase in support rigidity, is unsuitable for high-speed conveyance, and has a difficulty in obtaining the large strokes in view of the layout. However, with the layout configuration of this embodiment, the large strokes (feed operation amount, lift operation amount, and clamp operation amount) can be obtained while high-speed conveyance in the feed direction can be achieved.

(E) The present invention can avoid a risk such as damage of the feed bar during the outside preparation.

Figure 9:
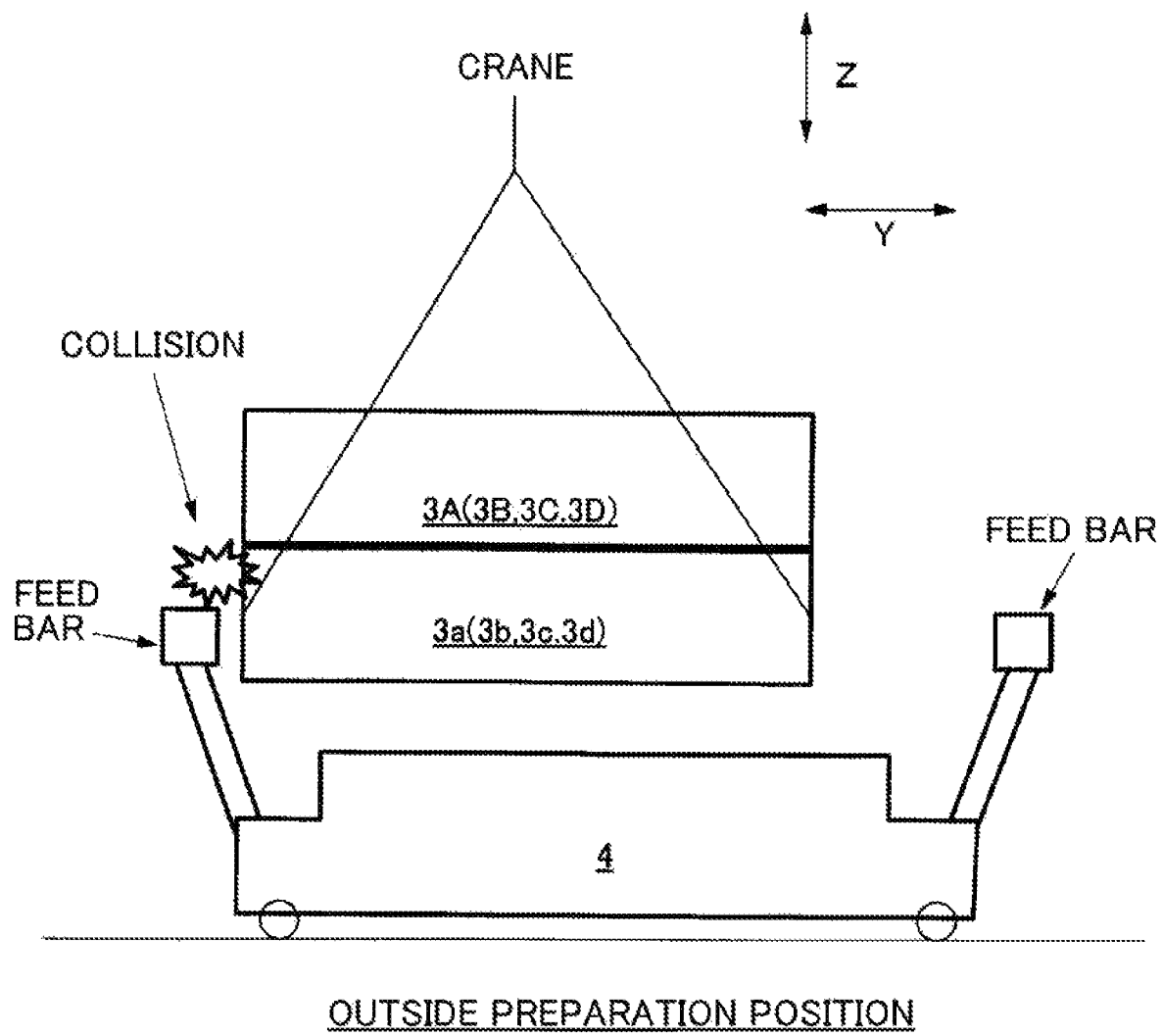
FIG. 9 is a front view for illustrating problems such as collision and damage, which may arise when the dies are replaced on the bolster in a related-art transfer press machine.

That is, in the related-art transfer press machine, as illustrated in FIG. 9, the feed bars, which are dismountable from the workpiece conveying apparatus, are mounted on both sides of the moving bolster. This is because, for example, adjustment of the workpiece holding tools is required in accordance with specifications of the dies so that the dies, the feed bars, and the workpiece holding tools are handled collectively in many cases. When the die replacement work is performed on the moving bolster at the outside preparation position, there is an accident in which the die is hit against the feed bar due to a mistake of crane work performed to, for example, lift up the die. This may lead to, for example, fall of the feed bar and damage of the component.

In contrast, the transfer system 1 according to this embodiment has the configuration in which the beam 10 can be (integrally) fixed and mounted to, for example, the columns of the transfer press machine 2, and hence can eliminate a trouble of the related art, which is caused due to the mistake of the crane work during the die replacement work. One of the reasons why the trouble can be eliminated is as follows. The workpiece conveying apparatus 100 in this embodiment can more easily change the position of the workpiece holding tool (gripper) 140 through control in accordance with, for example, the specifications of the dies (workpiece). As a result, work of adjusting the positions and postures of the workpiece holding tools individually in accordance with the specifications of the dies (workpiece) is not required unlike the related art, and hence it is not required that the moving bolster and the feed bars be handled collectively.

(F) The present invention can improve a degree of freedom in design of a scrap chute.

Figure 10:
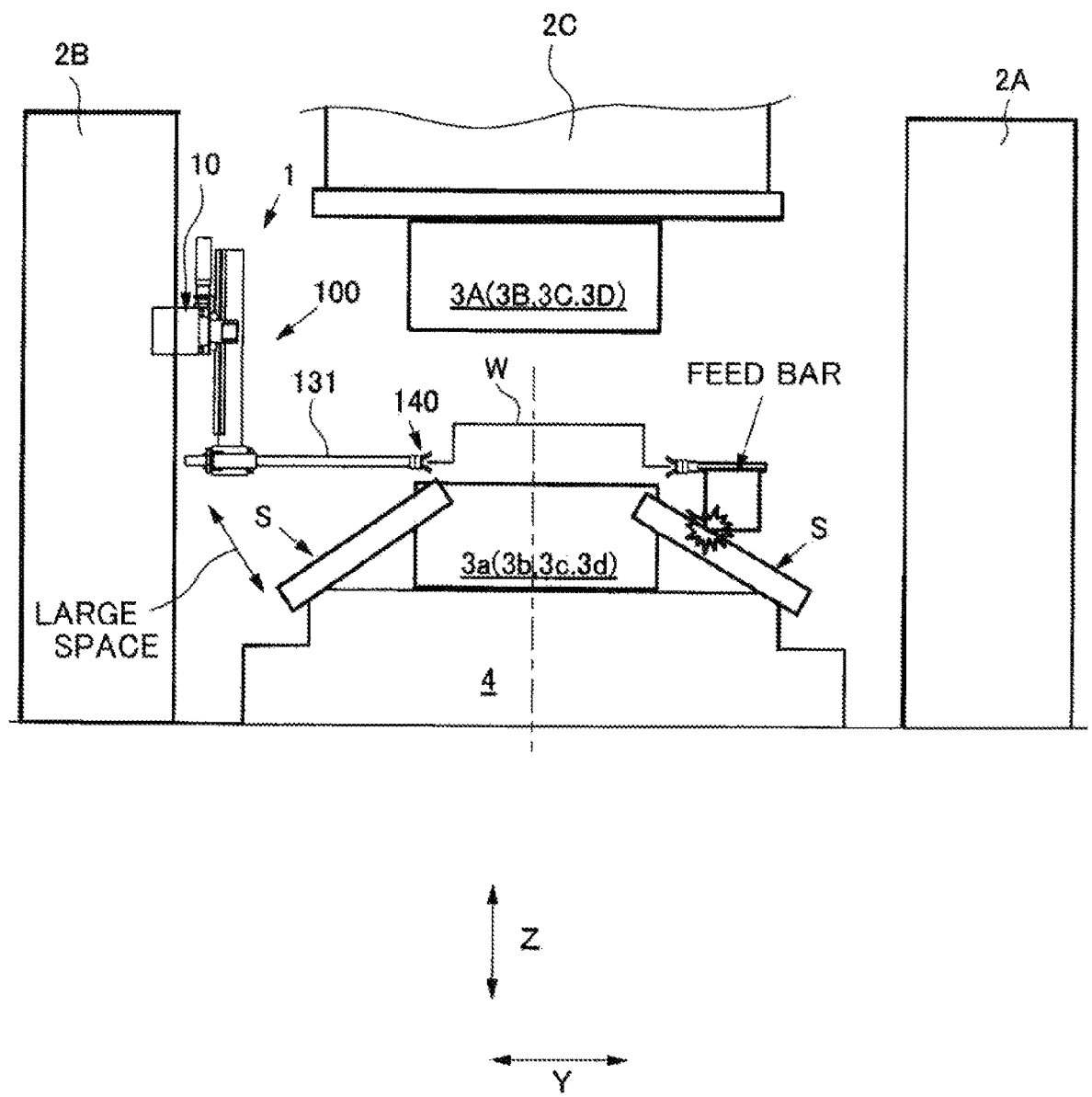
FIG. 10 is a front view for illustrating a problem in a scrap chute in the related-art transfer press machine of a feed bar type in the right half of FIG. 10, and illustrating ease of discharge of scrap in the workpiece conveying system in the left half of FIG. 10.

That is, as illustrated in the right side of FIG. 10, in the related-art type in which the entire feed bars are moved in the feed direction to convey the workpiece, an installation position of each of the feed bars is relatively close to the dies, and the feed bars each have a large cross section. Thus, a route of a chute (discharge) for a scrap S, which is a remaining material separated from the workpiece by pressing process, is limited within a narrow range. Through separation of two feed bars from each other, contact of the two feed bars with a scrap chute can be avoided. However, in this case, a length of the workpiece holding tool is increased, and hence it is required to increase strength along with the increase in length. When a diameter of the workpiece holding tool is increased in order to increase the strength, an overall weight of the workpiece holding tools themselves is increased in proportion to the number of steps. As a result, this configuration is unsuitable for high-speed conveyance.

Thus, hitherto, improvement of the degree of freedom in design of the scrap chute has not been achieved. However, in the transfer system 1 according to this embodiment illustrated in the left side of FIG. 10, the beam 10 can be provided at a position far from the lower dies, and only the clamp part (clamp moving element) 131 having an elongated shaft shape and the workpiece holding tool (gripper) 140 are brought closer to the dies and the workpiece, thereby being capable of improving the degree of freedom in design of the scrap chute.

(G) A crossbar 200 can be held by the workpiece conveying apparatus 100 opposed to each other.

As illustrated in FIG. 11, the crossbar 200 having a pipe shape (component obtained by mounting the workpiece holding tools to a bar provided to extend in the Y direction) can be held by the workpiece conveying apparatus 100, which are opposed to each other across the dies, so as to be sandwiched by the grippers 140. Thus, there can be employed crossbar-type conveyance in which the workpiece is conveyed in the workpiece conveying direction X under a state in which the workpiece is held by the crossbar 200.

The crossbar-type conveyance is performed in the related-art transfer system of a feed bar type. The crossbar transfer system of a feed bar type performs a feed operation and a raising-and-lowering operation, that is, operations in directions of two axes, and hence has a low degree of freedom in the operations. However, in crossbar conveyance of a robot type, which is performed by the workpiece conveying apparatus 100 in this embodiment, feed, raising-and-lowering, shift, and tilt operations, that is, operations in directions of four axes can be performed, thereby being capable of increasing a degree of freedom in workpiece conveyance.

(H) Wiring connected to, for example, the electric motor is easily handled.

The workpiece conveying apparatus in this embodiment has the configuration in which the screw nut 133, the spline nut 136, the electric motor 134 for screw nut configured to rotationally drive the screw nut 133, and the electric motor 137 for spline nut configured to rotationally drive the spline nut 136 are fixed and arranged on the second carrier 121. Thus, a movable portion of the wiring connected to the electric motor 134 for screw nut, and a movable portion of the wiring connected to the electric motor 137 for spline nut can be minimized. Thus, the wiring is easily handled, and the movable portion is small, thereby being capable of contributing to prevention of, for example, damage to the wiring.

(I) The workpiece can be conveyed stably at high speed.

The workpiece conveying apparatus in this embodiment has the configuration in which the screw nut 133, the spline nut 136, the electric motor 134 for screw nut configured to rotationally drive the screw nut 133, and the electric motor 137 for spline nut configured to rotationally drive the spline nut 136 are fixed and arranged on the second carrier 121. Thus, it is not required that the shaft-shaped clamp part (clamp moving element) 131 support a component having a large weight, such as the electric motor for drive, and it is only required that the clamp part (clamp moving element) 131 have a cross section (diameter) having shaft rigidity high enough to hold and convey the workpiece. Therefore, the configuration of this embodiment can contribute to have low kinetic energy, and the electric motor for drive can have a small capacity, thereby being capable of achieving reduction in weight and size of the apparatus. Further, the clamp part (clamp moving element) 131 bends less, thereby being capable of significantly contributing to high-speed and stable workpiece conveyance.

(J) The workpiece conveying apparatus having a small size in the workpiece conveying direction (X direction) can be provided (see FIG. 2A and FIG. 2B).

Thus, a large operable (movable) region can be secured for the adjacent workpiece conveying apparatus 100.

(K) The workpiece conveying apparatus (in particular, the clamp device) having a small size in the raising and lowering direction (Z direction) can be provided.

In this embodiment, the two electric motors 134 and 137 are arranged on right and left sides of the clamp device 130. That is, the electric motors 134 and 137 are arranged along the feed direction so that the third carrier 131 are positioned between both of the electric motors 134 and 137. Hence, a space can be secured so as not to hinder movement (carrying in and out) of the dies together with the moving bolster.

Further, when employing, as in this embodiment, a configuration in which a component such as the electric motor, which has a large size and significantly protrudes downward from a lower surface (lower side) of the workpiece conveying apparatus 100 (in particular, the raising and lowering device 120) is not mounted, the larger space can be secured.

(L) Even when the (right and left) workpiece conveying apparatus 100 opposed to each other across the workpiece hold the workpiece at different positions, each of the workpiece conveying apparatus 100 can convey the workpiece while freely assuming a workpiece conveyance posture.

That is, as illustrated in FIG. 12A to FIG. 12E, even when the right and left workpiece conveying apparatus 100A and 100B hold the workpiece W at different positions, each of the workpiece conveying apparatus 100 (100A and 100B) in this embodiment can set (change) the position of the workpiece holding tool (gripper) 140 (X, Y, and Z coordinates and a tilt angle) to the freely selected position separately and independently, thereby being capable of satisfactorily picking up and holding the workpiece.

Figure 17A:
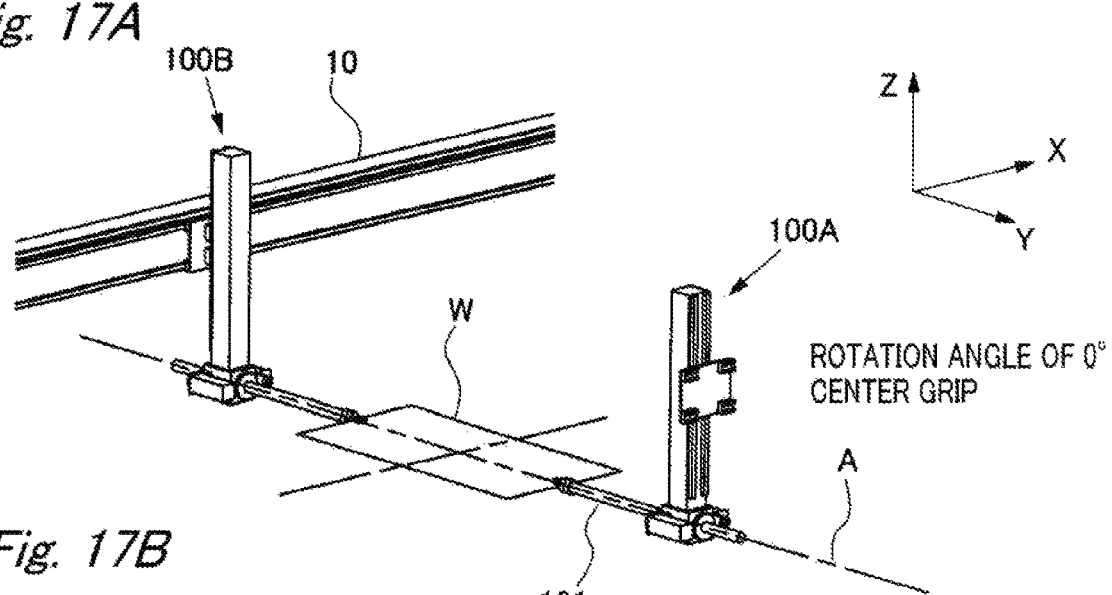
FIG. 17A is a perspective view (state at a rotation angle of 0 degrees) for illustrating an example of positions and rotation control of the workpiece conveying apparatus when the workpiece W is conveyed while being turned over in a case in which workpiece holding positions of the workpiece conveying apparatus arranged so as to be opposed to each other in the workpiece conveying system are not offset from a rotation center A.
Figure 17B:
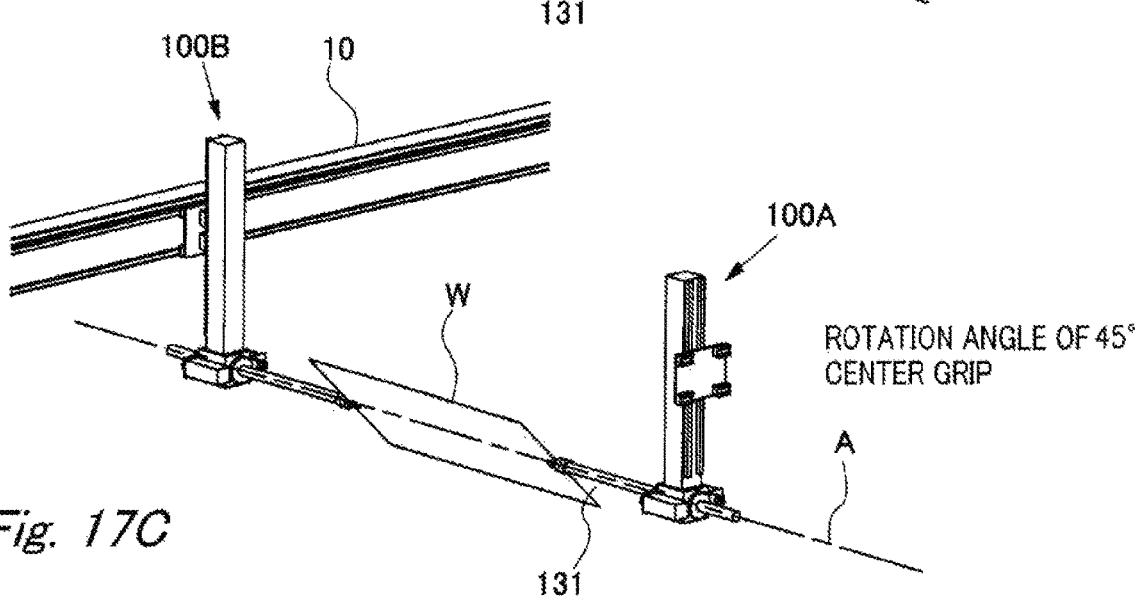
FIG. 17B is a perspective view for illustrating a state in which the rotation angle is 45 degrees.
Figure 17C:
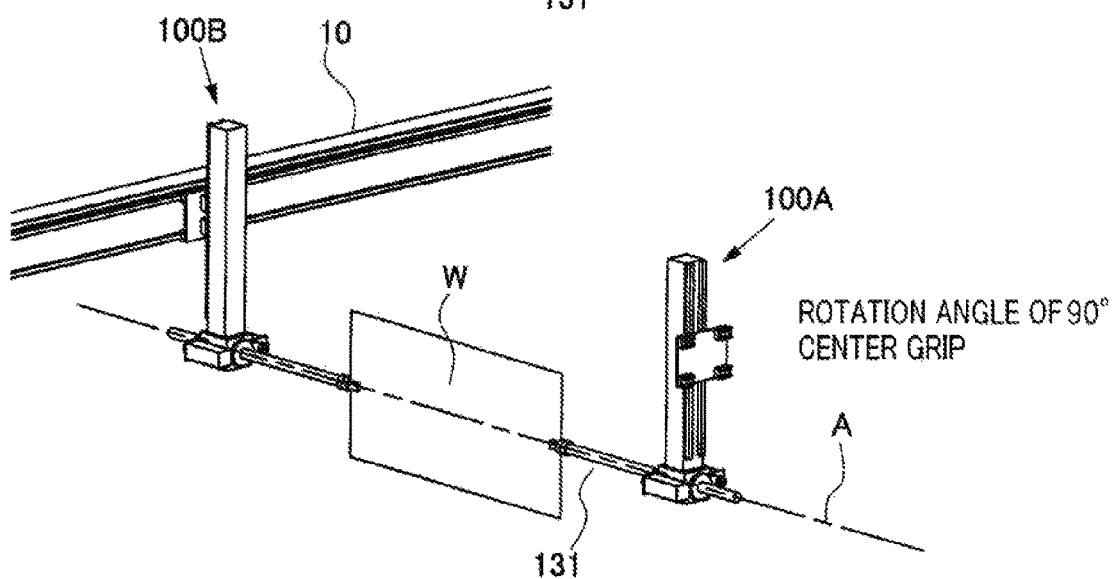
FIG. 17C is a perspective view for illustrating a state in which the rotation angle is 90 degrees.
Figure 18:
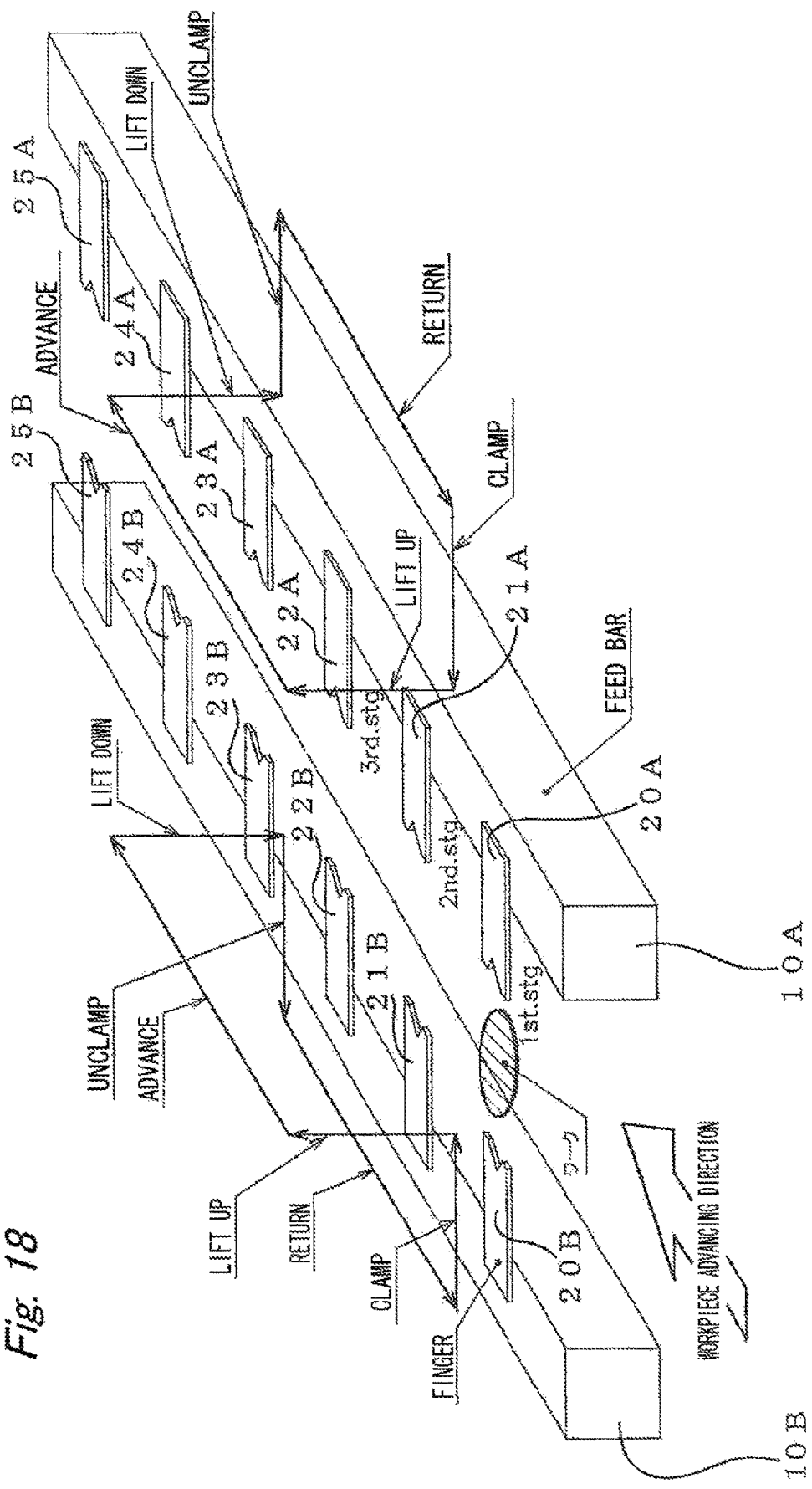
FIG. 18 is a perspective view (view for illustrating operations) for illustrating an example of a workpiece conveying apparatus (of a feed bar type) of a related-art press machine (transfer press machine).

Incidentally, the workpiece conveying apparatus 100 (100A and 100B) in this embodiment can convey the workpiece W to the subsequent step (next step) while rotating the workpiece W about the Y axis. However, as illustrated in FIG. 17A to FIG. 17C, when the right and left workpiece conveying apparatus 100A and 100B hold the workpiece W at positions aligned with a rotation center A in the direction of the Y axis (at positions on the same axis), in the mode as illustrated in FIG. 17A to FIG. 17C, the workpiece W can be conveyed while being rotated (can be fed to the dies for the next step under a state in which the workpiece W is turned over) by rotating the clamp parts 131 of the right and left workpiece conveying apparatus 100A and 100B in opposite directions (in a plane symmetrical manner) about the long axis (Y axis) (rotation center A).

However, as illustrated in FIG. 12A to FIG. 12E, when the workpiece W has a complicated shape and the right and left workpiece conveying apparatus 100A and 100B hold the workpiece W at positions that are not on the same axis, the related-art apparatus has not been capable of conveying the workpiece W to the next step (downstream step) while rotating (turning over) the workpiece W about the Y axis. However, in this embodiment, the right and left workpiece conveying apparatus 100A and 100B are controllable separately and independently (mutually independently). Thus, in order that the workpiece W can be rotated about the rotation center (imaginary rotation axis) VA of the workpiece W in accordance with each deviation (X-direction deviation, Y-direction deviation, or Z-direction deviation) of each of right and left holding positions (each of the right and left clamp parts 131) from the rotation center (imaginary rotation axis) VA of the workpiece W, the X, Y, and Z coordinates of each of the right and left holding positions (each of the right and left clamp parts 131) can be controlled suitably in accordance with a change in each deviation accompanied with a change in rotation angle position. Therefore, even in this case, according to this embodiment, the workpiece W can be conveyed to the next step (downstream step) while being turned over (see FIG. 12A to FIG. 16E).

As described above, according to this embodiment, it is possible to provide the workpiece conveying system (workpiece conveying apparatus) for a transfer press machine, which is capable of changing the position and posture of the workpiece holding tool (workpiece holding apparatus) in accordance with, for example, the specifications (such as the shape and the size) of the workpiece to be held, and the conveyance posture and the conveyance path to be required while contributing to high-speed conveyance of the workpiece with the relatively simple and low-cost configuration.

In this embodiment, in FIG. 1A, FIG. 1B, FIG. 6, FIG. 7A, FIG. 7B, and FIG. 11 to FIG. 17C, there is exemplified the case in which the two workpiece conveying apparatus (robots) 100 are arranged so as to be opposed to each other across the workpiece (dies or steps), and the two workpiece conveying apparatus (robots) 100 cooperate to convey the workpiece. However, the present invention is not limited thereto. The present invention is applicable also to a case in which the workpiece is held and conveyed by any one of the workpiece conveying apparatus (robots) 100, and a case in which separate workpieces are held and conveyed by the two workpiece conveying apparatus (robots) 100, respectively.

According to the present invention, it is possible to provide the workpiece conveying system for a transfer press machine, which is capable of changing the position and posture of the workpiece holding tool (workpiece holding apparatus) in accordance with, for example, the specifications (such as the shape and the size) of the workpiece to be held, and the conveyance posture and the conveyance path to be required while contributing to high-speed conveyance of the workpiece with the relatively simple and low-cost configuration.

The embodiments described above are merely examples for describing the present invention. It goes without saying that various modifications may be made without departing from the gist of the present invention.

What is claimed is:

1. A workpiece conveying system for a transfer press machine, comprising:
   a beam provided to extend in a feed direction of a workpiece, the beam being provided substantially integrally with the transfer press machine; and
   a plurality of workpiece conveying apparatus supported by the beam,
   the plurality of workpiece conveying apparatus each including:
      a feed device including a first carrier that is movable relative to the beam in the feed direction, the first carrier supporting a drive source for feed, the feed device being configured to control the relative movement of the first carrier by the drive source for feed;
      a raising and lowering device supported by the first carrier, the raising and lowering device including a second carrier that is movable relative to the first carrier in a raising and lowering direction, the second carrier supporting a drive source for raising and lowering, the raising and lowering device being configured to control the relative movement of the second carrier by the drive source for raising and lowering;
      a clamp device supported on a lower end side of the second carrier, the second carrier supporting a drive source for clamping, the clamp device including a third carrier that is movable relative to the second carrier in a clamp direction of clamping the workpiece, the clamp device being configured to control the relative movement of the third carrier by the drive source for clamping; and
      at least one workpiece holding tool supported at a distal end of the third carrier, the at least one workpiece holding tool configured to hold and release the workpiece,
   wherein the plurality of workpiece conveying apparatus each separately and independently controls i) the relative movement of the first carrier along the feed direction by the drive source for feed of the feed device, ii) the relative movement of the second carrier along the raising and lowering direction by the drive source for raising and lowering of the raising and lowering device, and iii) the relative movement of the third carrier along the clamp direction by the drive source for clamping of the clamp device to convey each workpiece.

2. The workpiece conveying system for a transfer press machine according to claim 1,
   wherein the third carrier is a shaft-shaped member, and
   wherein a long-axis direction of the third carrier extends in the clamp direction.

3. The workpiece conveying system for a transfer press machine according to claim 2,
   wherein an outer peripheral spiral groove is formed in an outer periphery of the shaft-shaped member,
   wherein the clamp device includes:
      a screw nut, which has an inner peripheral spiral groove to be engaged with the outer peripheral spiral groove through intermediation of balls for screw; and
      an electric motor for screw nut configured to rotationally drive the screw nut, and
   wherein the shaft-shaped member is moved relative to the second carrier in the clamp direction by rotating the screw nut in a predetermined direction through rotational drive of the electric motor for screw nut.

4. The workpiece conveying system for a transfer press machine according to claim 2,
   wherein an outer peripheral spline groove is formed in an outer periphery of the shaft-shaped member so as to extend in a long-axis direction of the shaft-shaped member,
   wherein the clamp device includes:
      a spline nut, which has an inner peripheral spline groove to be engaged with the outer peripheral spline groove through intermediation of balls for spline; and
      an electric motor for spline nut configured to rotationally drive the spline nut, and
   wherein the shaft-shaped member is rotated about the long axis relative to the second carrier by rotating the spline nut in a predetermined direction through rotational drive of the electric motor for spline nut.

5. The workpiece conveying system for a transfer press machine according to claim 3,
   wherein an outer peripheral spline groove is formed in an outer periphery of the shaft-shaped member so as to extend in a long-axis direction of the shaft-shaped member,
   wherein the clamp device includes:
      a spline nut, which has an inner peripheral spline groove to be engaged with the outer peripheral spline groove through intermediation of balls for spline; and
      an electric motor for spline nut configured to rotationally drive the spline nut, and
   wherein the shaft-shaped member is rotated about the long axis relative to the second carrier by rotating the spline nut in a predetermined direction through rotational drive of the electric motor for spline nut.

6. The workpiece conveying system for a transfer press machine according to claim 2,
   wherein an outer peripheral spiral groove and an outer peripheral spline groove, which extends in the long-axis direction, are formed in an outer periphery of the shaft-shaped member,
   wherein the clamp device includes:
      a screw nut, which has an inner peripheral spiral groove to be engaged with the outer peripheral spiral groove through intermediation of balls for screw; and
      an electric motor for screw nut configured to rotationally drive the screw nut,
   wherein the clamp device further includes:

a spline nut, which has an inner peripheral spline groove to be engaged with the outer peripheral spline groove through intermediation of balls for spline; and an electric motor for spline nut configured to rotationally drive the spline nut, and wherein when the spline nut is rotated in a predetermined direction through rotational drive of the electric motor for spline nut so as to rotate the shaft-shaped member about the long axis relative to the second carrier, movement of the shaft-shaped member relative to the second carrier in the clamp direction, which is accompanied with relative rotation of the shaft-shaped member about the long axis, is absorbed by rotating the screw nut in a predetermined direction through rotational drive of the electric motor for screw nut.

7. The workpiece conveying system for a transfer press machine according to claim 1, wherein the plurality of workpiece conveying apparatus are separately and independently controllable.

8. The workpiece conveying system for a transfer press machine according to claim 2, wherein the plurality of workpiece conveying apparatus are separately and independently controllable.

9. The workpiece conveying system for a transfer press machine according to claim 3, wherein the plurality of workpiece conveying apparatus are separately and independently controllable.

10. The workpiece conveying system for a transfer press machine according to claim 4, wherein the plurality of workpiece conveying apparatus are separately and independently controllable.

11. The workpiece conveying system for a transfer press machine according to claim 5, wherein the plurality of workpiece conveying apparatus are separately and independently controllable.

12. The workpiece conveying system for a transfer press machine according to claim 6, wherein the plurality of workpiece conveying apparatus are separately and independently controllable.

* * * * *